(12) United States Patent
Sholev

(10) Patent No.: US 12,433,474 B2
(45) Date of Patent: Oct. 7, 2025

(54) CONTROL SYSTEM FOR A COLONOSCOPE

(71) Applicant: Human Xtensions Ltd., Netanya (IL)

(72) Inventor: Mordehai Sholev, Moshav Amikam (IL)

(73) Assignee: Human Xtensions Ltd., Netanya (IL)

( * ) Notice: Subject to any disclaimer, the term of this patent is extended or adjusted under 35 U.S.C. 154(b) by 375 days.

(21) Appl. No.: 17/801,814

(22) PCT Filed: Feb. 24, 2021

(86) PCT No.: PCT/IL2021/050211
§ 371 (c)(1),
(2) Date: Aug. 24, 2022

(87) PCT Pub. No.: WO2021/171292
PCT Pub. Date: Sep. 2, 2021

(65) Prior Publication Data
US 2023/0104573 A1  Apr. 6, 2023

Related U.S. Application Data

(60) Provisional application No. 62/981,569, filed on Feb. 26, 2020.

(51) Int. Cl.
*A61B 1/00* (2006.01)
*A61B 1/005* (2006.01)
*A61B 1/31* (2006.01)

(52) U.S. Cl.
CPC ...... *A61B 1/00042* (2022.02); *A61B 1/00121* (2013.01); *A61B 1/00133* (2013.01);
(Continued)

(58) Field of Classification Search
CPC ........... A61B 1/00042; A61B 1/00121; A61B 1/00133; A61B 1/00149; A61B 1/0016;
(Continued)

(56) References Cited

U.S. PATENT DOCUMENTS

| | | |
|---|---|---|
| 5,159,446 A | 10/1992 | Hibino et al. |
| 2005/0070764 A1 | 3/2005 | Nobis et al. |

(Continued)

FOREIGN PATENT DOCUMENTS

| | | |
|---|---|---|
| CN | 104027061 | 9/2014 |
| CN | 106491211 | 3/2017 |

(Continued)

OTHER PUBLICATIONS

Supplementary European Search Report and the European Search Opinion Dated Feb. 27, 2024 From the European Patent Office Re. Application No. 21761572.3. (9 Pages).

(Continued)

*Primary Examiner* — Anh Tuan T Nguyen
*Assistant Examiner* — James Edward Boice

(57) ABSTRACT

A control system for a colonoscope having a shaft deflectable via two rotatable knobs is provided. The system includes a first drive unit mounted externally to a housing of the colonoscope. The first drive unit includes a first drive mechanism for engaging the two rotatable knobs or gears replacing the two rotatable knobs. The system further includes a second drive unit attachable to the shaft of the endoscope. The second drive unit is capable of linearly translating the shaft forward and backward. A user interface engageable by a palm of a hand controls the first drive mechanism.

6 Claims, 24 Drawing Sheets

(52) U.S. Cl.
CPC ........ *A61B 1/00149* (2013.01); *A61B 1/0016* (2013.01); *A61B 1/0052* (2013.01); *A61B 1/31* (2013.01)

(58) Field of Classification Search
CPC ....... A61B 1/0052; A61B 1/31; A61B 6/4458; A61B 34/00; A61B 34/30; A61B 2034/301–304
USPC .......................................................... 600/102
See application file for complete search history.

(56) References Cited

U.S. PATENT DOCUMENTS

| | | | | |
|---|---|---|---|---|
| 2013/0035548 | A1* | 2/2013 | Ianchulev | A61B 1/00052 128/200.26 |
| 2018/0098687 | A1 | 4/2018 | Sholcv | |
| 2019/0125169 | A1 | 5/2019 | Vargas | |

FOREIGN PATENT DOCUMENTS

| | | |
|---|---|---|
| JP | 04-002318 | 1/1992 |
| JP | 11-032977 | 2/1999 |
| JP | 2006-527600 | 12/2006 |
| JP | 2018-526042 | 9/2018 |
| WO | WO 2021/171292 | 9/2021 |

OTHER PUBLICATIONS

International Preliminary Report on Patentability Dated Sep. 9, 2022 From the International Bureau of WIPO Re. Application No. PCT/IL2021/050211. (6 Pages).

International Search Report and the Written Opinion Dated Jun. 9, 2021 From the International Searching Authority Re. Application No. PCT/IL2021/050211. (14 Pages).

Notice of Reason(s) for Rejection Dated Jan. 14, 2025 From the Japan Patent Office Re. Application No. 2022-549937 and Its Translation Into English. (8 Pages).

Communication Pursuant to Article 94(3) EPC Dated Jun. 30, 2025 From the European Patent Office Re. Application No. 21761572.3 (28 Pages).

\* cited by examiner

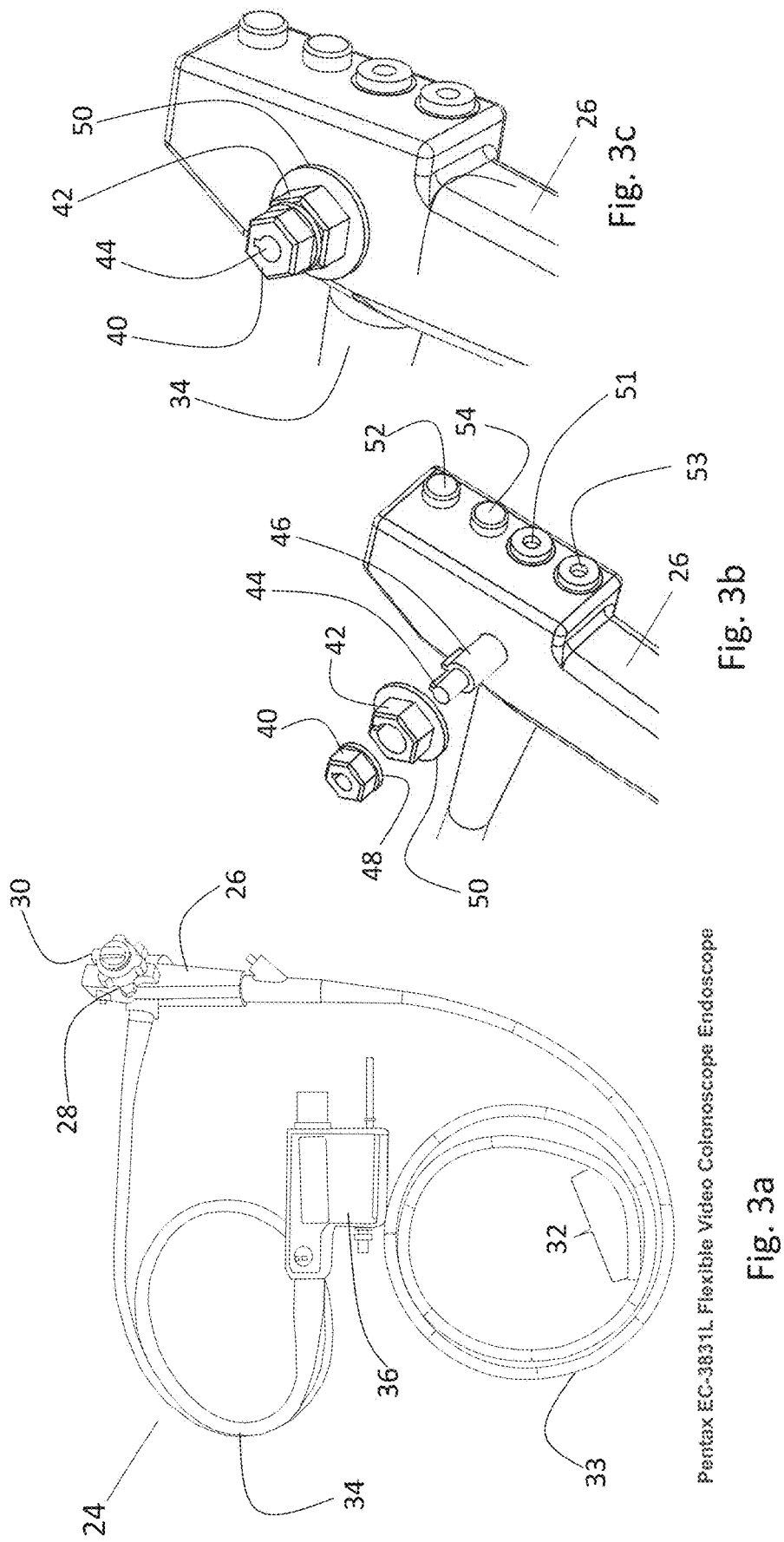

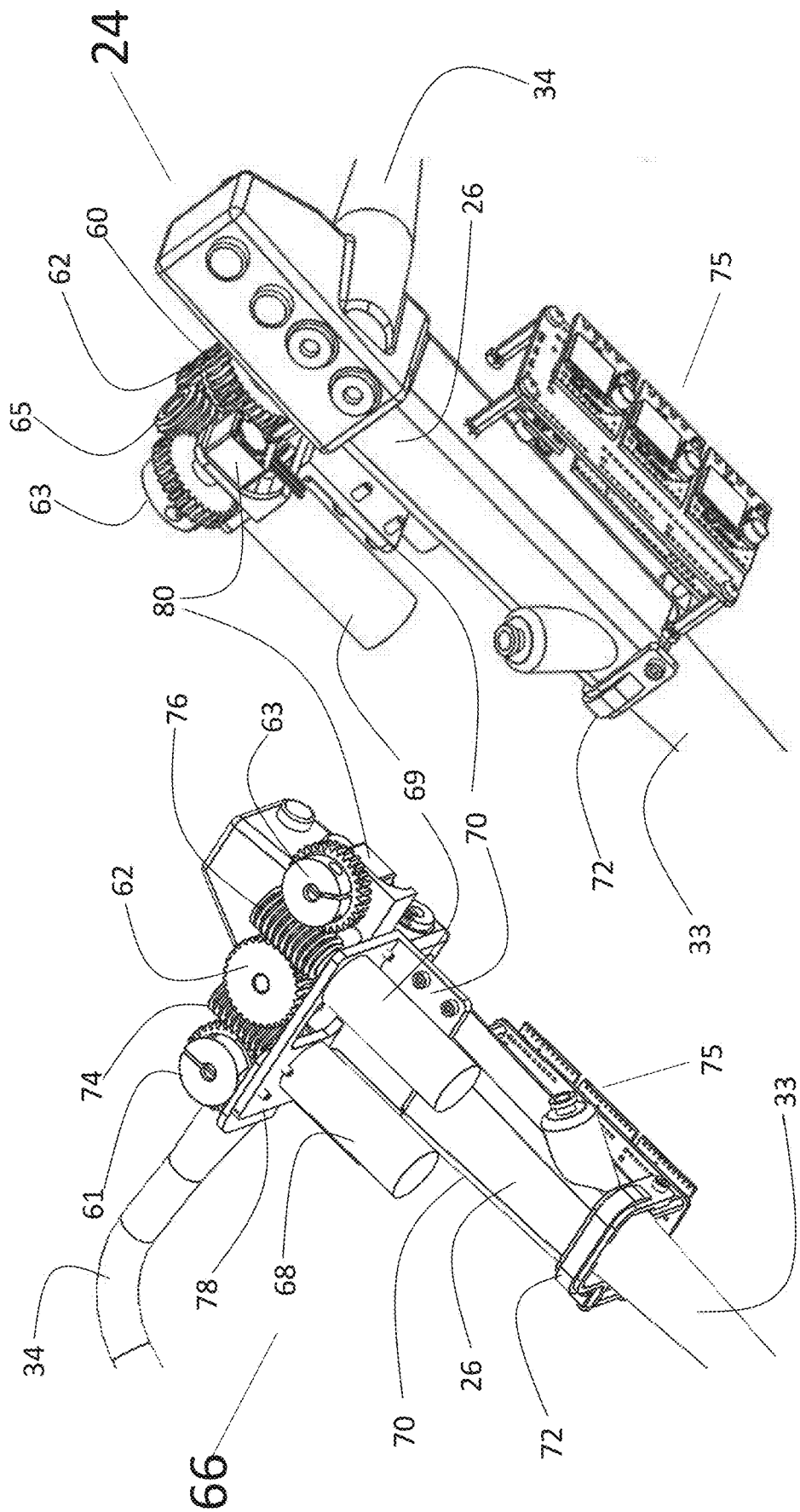

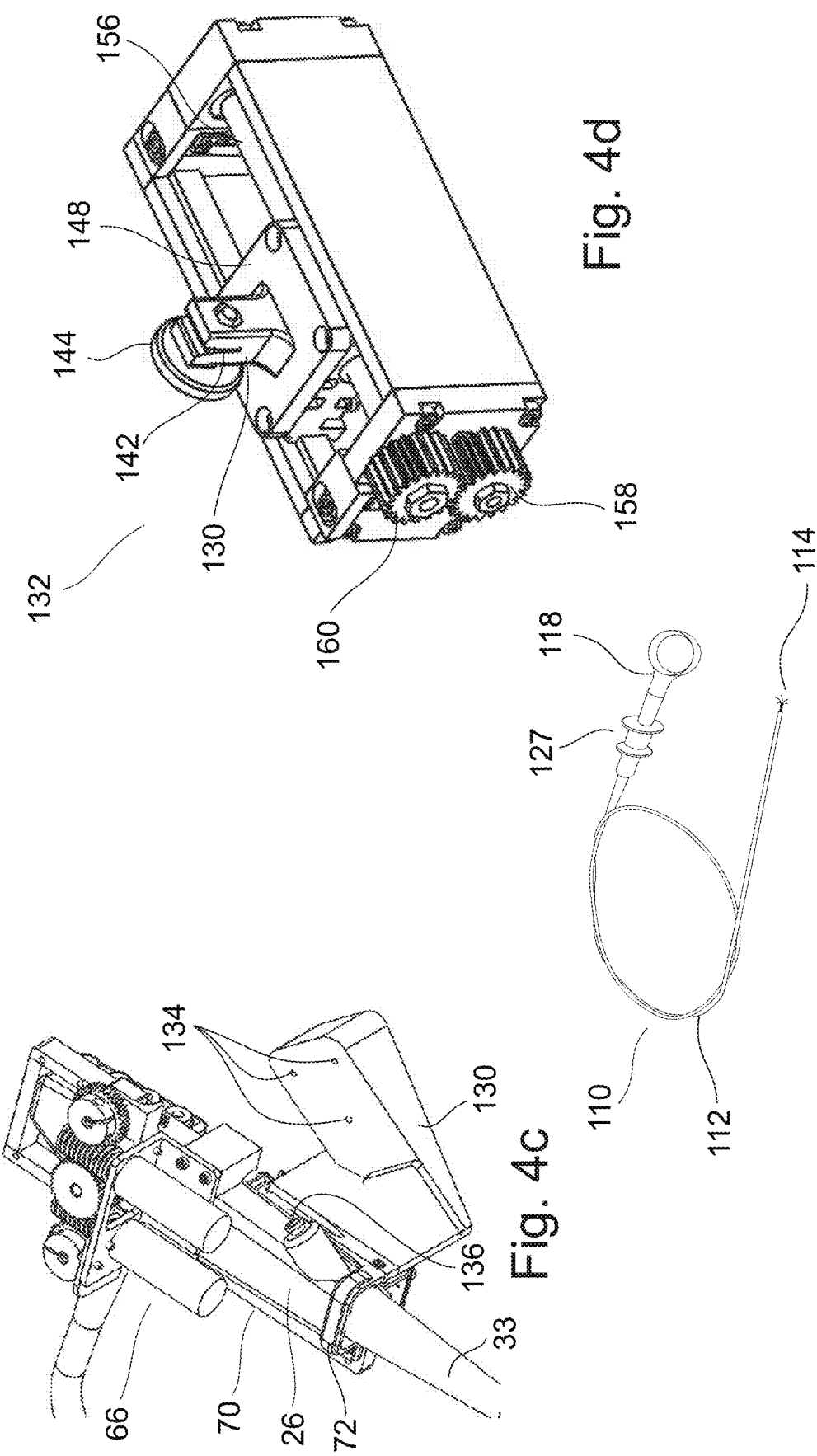

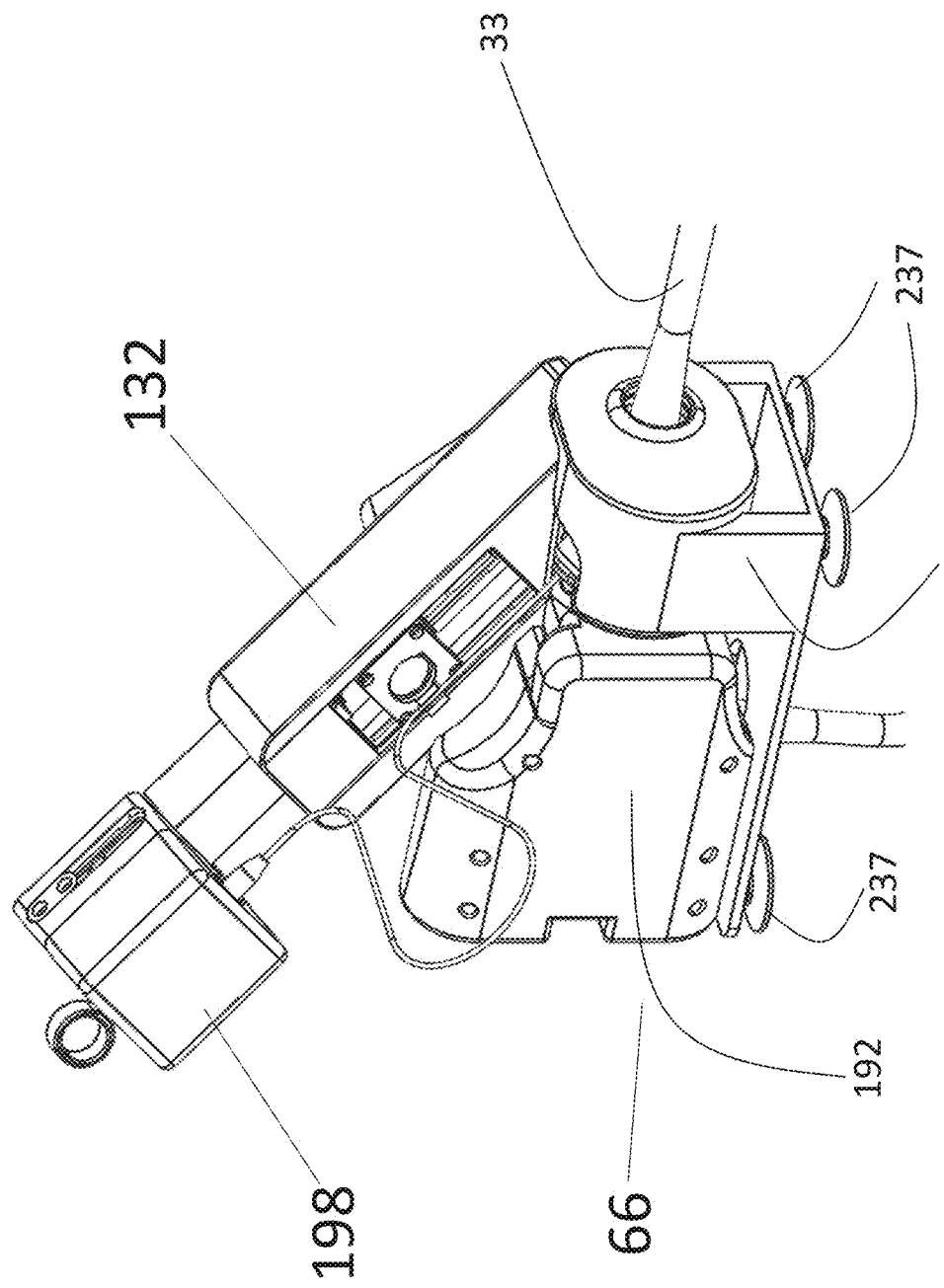

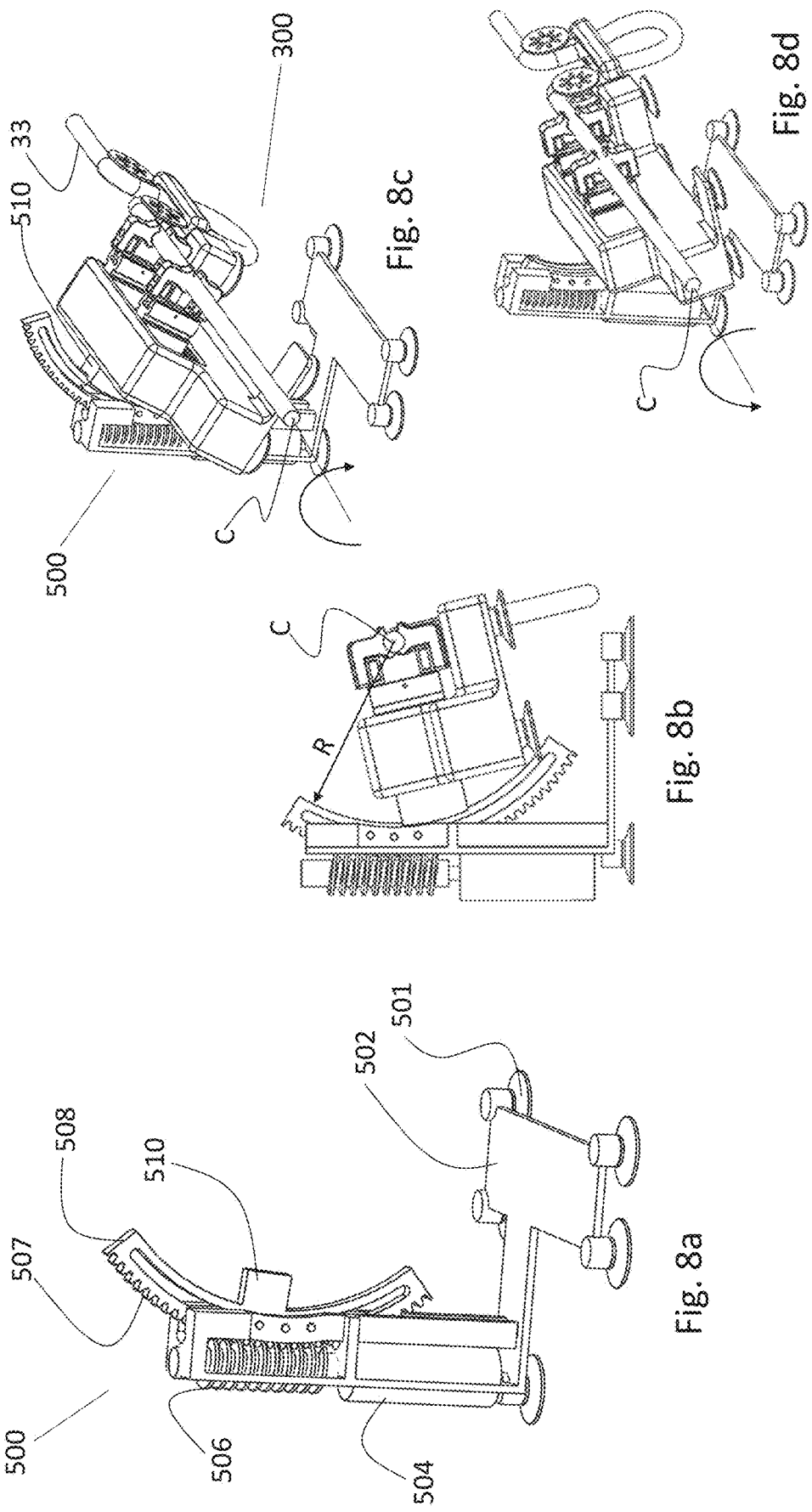

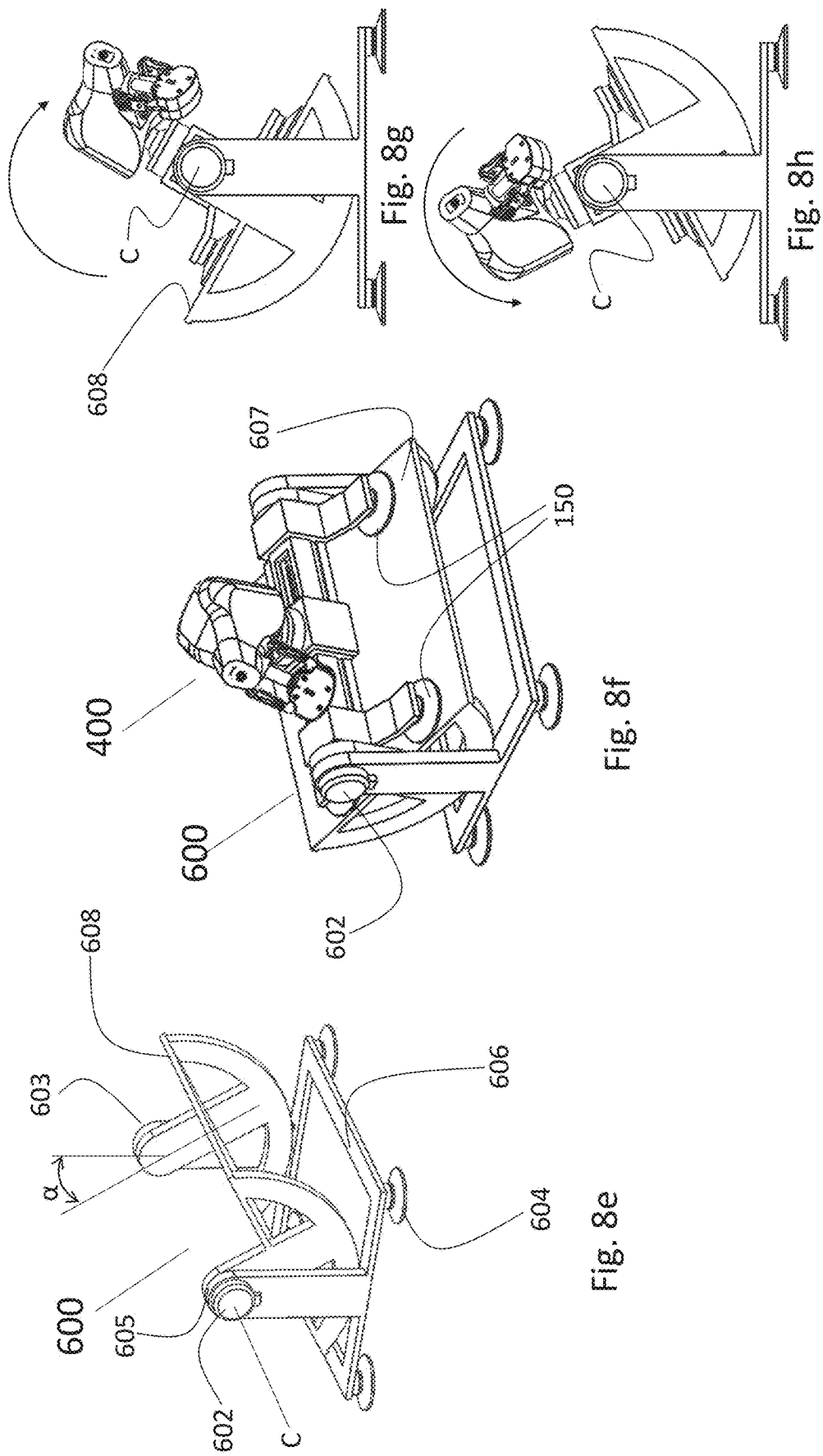

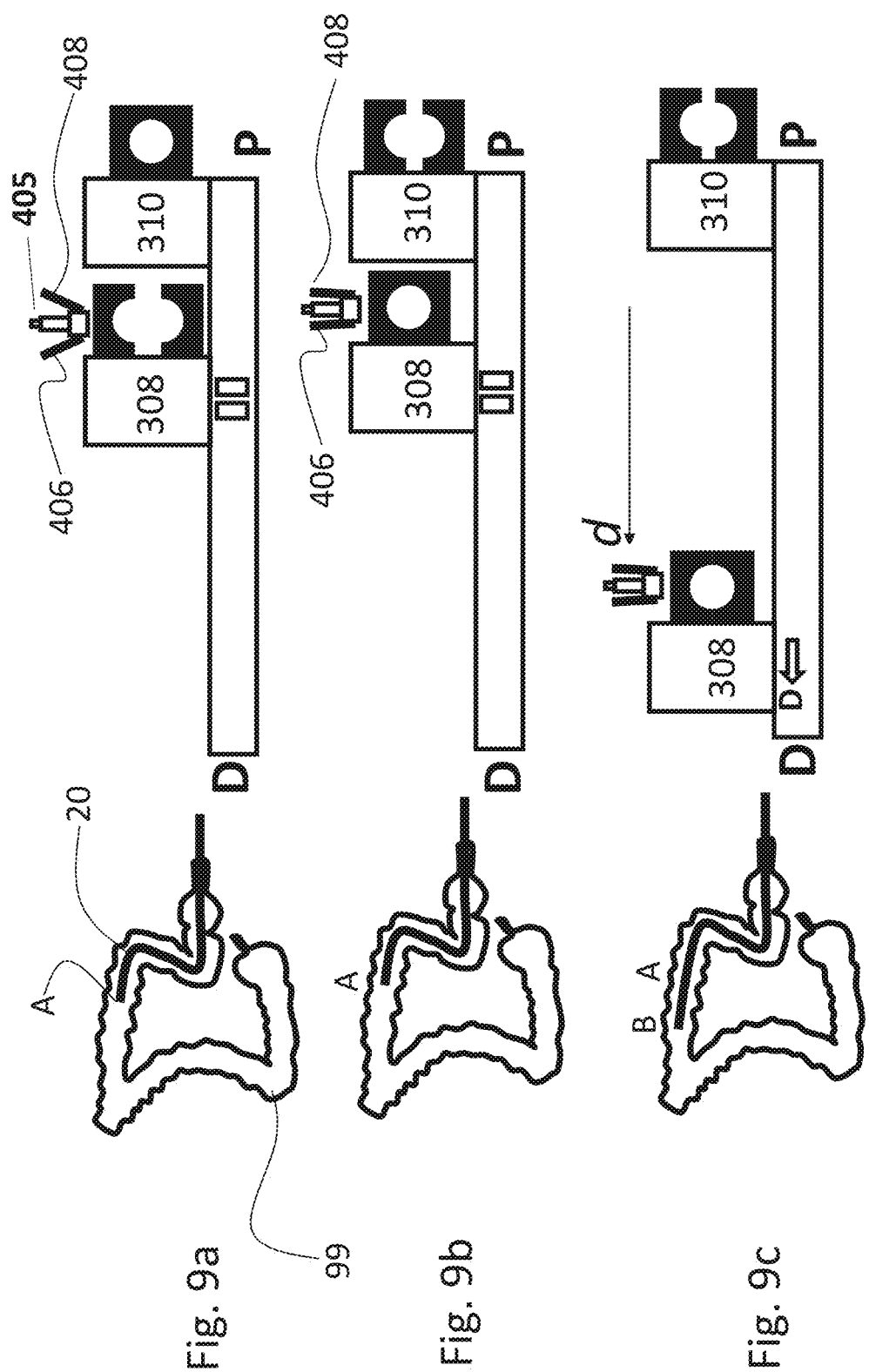

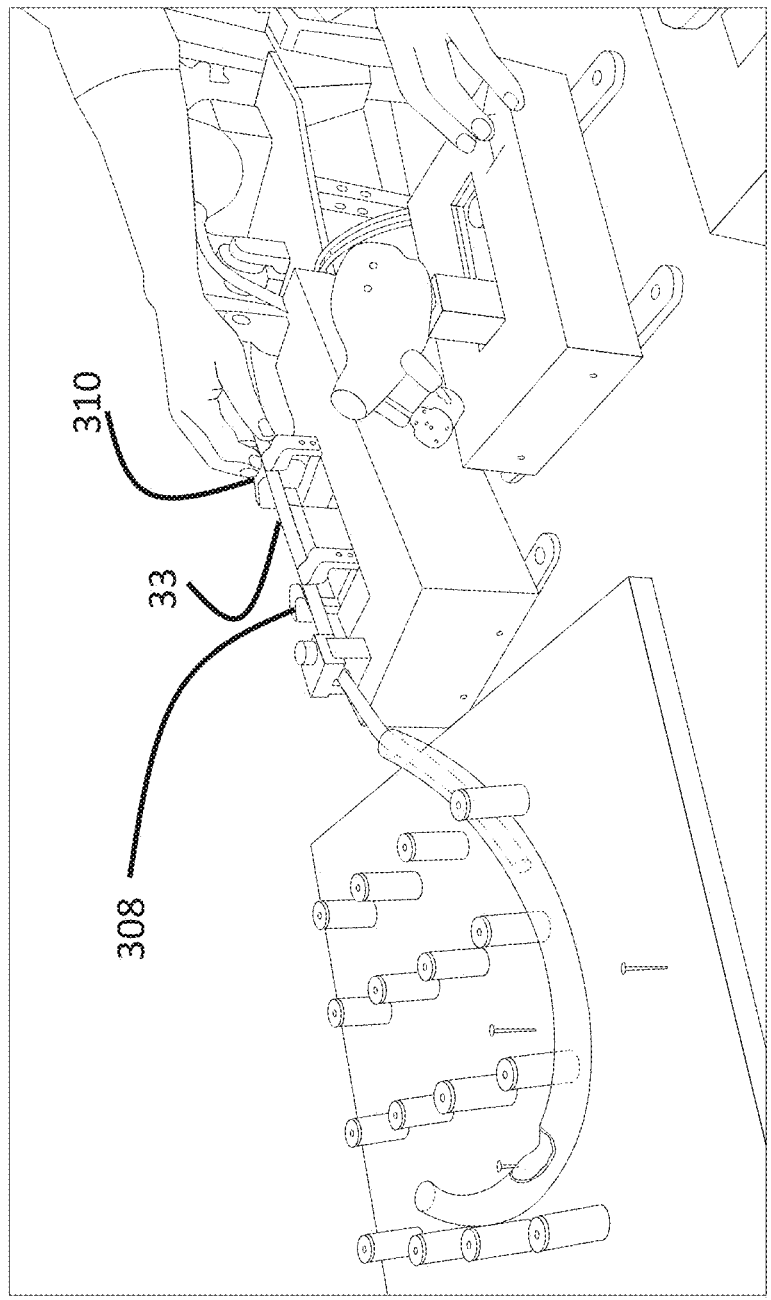

CONTROL SYSTEM FOR A COLONOSCOPE

RELATED APPLICATIONS

This application is a National Phase of PCT Patent Application No. PCT/IL2021/050211 having International filing date of Feb. 24, 2021, which claims the benefit of priority under 35 USC § 119 (e) of U.S. Provisional Patent Application No. 62/981,569 filed on Feb. 26, 2020. The contents of the above applications are all incorporated by reference as if fully set forth herein in their entirety.

FIELD AND BACKGROUND OF THE INVENTION

The present invention relates to a system for motorized control of a standard colonoscope. Embodiments of the present invention relate to a control system that includes a control interface and linked motorized drive units and adaptors for retrofitting a standard colonoscope.

Colonoscopy is a medical procedure in which a flexible endoscope, or colonoscope, is advanced into a patient's lower GI tract for diagnostic examination and/or surgical treatment of the colon. A standard colonoscope is typically 135-185 cm in length and 12-19 mm in diameter and includes a control head and a flexible shaft with a maneuverable tip that includes a camera or an optic fiber bundle. The head is connected to a light source via an 'umbilical' cord, through which pass other tubes transmitting air, water and suction, etc. The working channel is used for the passage of diagnostic or therapeutic tools.

Two one on the top of another mounted rotatable knobs are mounted on the side of the control head and are used for up/down and right/left movement of the shaft tip. The colonoscope is manually advanced within the lower GI tract by pushing and pulling the control head and shaft.

The lower colon is highly torturous and the colonoscope rubs against the mucosal surface of the colon along the outside of each turn as the colonoscope is advanced within the colon. Friction and slack in the colonoscope build up at each turn, making it more and more difficult to advance and withdraw the colonoscope.

A colonoscope can be maneuvered through torturous anatomy however, such maneuvering requires experience and use of both hands rendering simultaneous control over any other instrument (e.g. diagnostic or therapeutic tool positioned through the working channel) impossible.

In order to address this limitation of standard flexible colonoscopes, the present inventor devised a control unit, which enables an operator to remotely control the tip of a flexible endoscope as well as the advancement of the colonoscope shaft.

SUMMARY OF THE INVENTION

The present invention provides a control system for a colonoscope having a shaft deflectable via two rotatable knobs, the control system comprising: a first drive unit mounted externally to a housing of the colonoscope, said first drive unit includes a first drive mechanism for engaging the two rotatable knobs or gears replacing the two rotatable knobs; a second drive unit being attachable to the shaft of the endoscope, said second drive unit being capable of linearly translating the shaft forward and backward; and a user interface including a first interface being mounted on a pivotal support, the first interface being engageable by a palm of a hand, the user interface being for controlling the first drive unit and optionally the second drive unit.

The control system can also include a third drive unit being attachable to the shaft of a 'baby tool', the third drive unit is capable of linearly translating the 'baby tool' shaft forward and backward; and activate the end effector at the distal end of the 'baby tool' shaft.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

BRIEF DESCRIPTION OF THE SEVERAL VIEWS OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIGS. 3a-i illustrate a standard colonoscope (FIG. 3a) fitted with standard control knobs (FIGS. 3d-f) or adaptor gears (FIGS. 3g-i).

FIGS. 4a-l illustrate a shaft deflection drive unit of the present invention and its components, a 'baby tool' is shown in FIG. 4e, a baby tool drive module is shown in FIGS. 4f-1.

FIGS. 8a-h illustrate add on module and interface, allowing the control endoscope shaft roll movement.

FIGS. 9a-g schematically illustrate a sequence of interface inputs and corresponding shaft advancement within the colon.

FIGS. 12a-h illustrate bench-testing of a prototype constructed in accordance with the teachings of the present invention.

DESCRIPTION OF SPECIFIC EMBODIMENTS OF THE INVENTION

Figure 1:
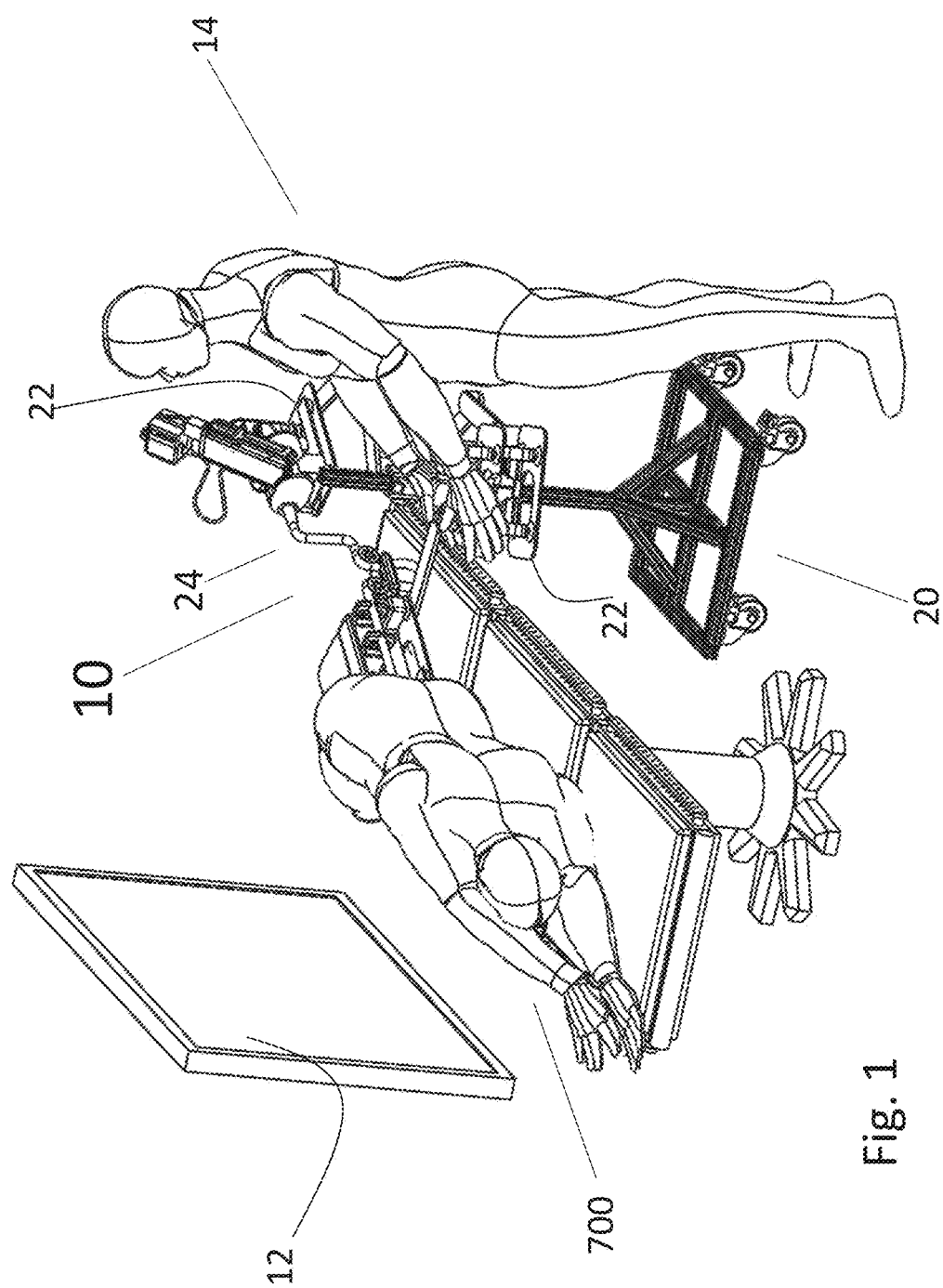
FIG. 1 illustrates the present system in an operating room setting.

The present invention is of a colonoscope control system which can be used to control a standard colonoscope.

Specifically, the present invention can be used to remotely control a standard colonoscope and enable a surgeon to accurately maneuver a colonoscope through the lower GI as well as operate 'baby tools' positioned through a working channel of the endoscope.

The principles and operation of the present invention may be better understood with reference to the drawings and accompanying descriptions.

Before explaining at least one embodiment of the invention in detail, it is to be understood that the invention is not limited in its application to the details set forth in the following description or exemplified by the Examples. The invention is capable of other embodiments or of being practiced or carried out in various ways. Also, it is to be understood that the phraseology and terminology employed herein is for the purpose of description and should not be regarded as limiting.

Maneuvering a standard colonoscope through the torturous anatomy of the lower GI requires skill and experience. One of the most serious complications of colonoscopy is endoscopic perforation of the colon, which has been reported as between 0.03% and 0.7%. Although colonoscopic perforation (CP) is a rare complication, it can be associated with high mortality and morbidity rates.

While reducing the present invention to practice, the present inventors devised a colonoscope control system that enables accurate and intuitive control over colonoscope maneuvering within the lower GI tract. As is further described herein, the present control system can be retrofitted to existing standard colonoscope and enable switching between motorized and manual control over shaft advancement and/or deflection.

Thus, according to one aspect of the present invention there is provided a control system for a colonoscope having a shaft deflectable via two rotatable knobs.

The control system of the present invention includes a first drive unit mounted externally to a housing of the colonoscope. The first drive unit includes a first drive mechanism for engaging the two rotatable knobs of the colonoscope or an adaptor that includes gears that replace the two rotatable knobs. The gears are mounted on the shafts of the two rotatable knobs.

The control system also includes a second drive unit that is attachable to the shaft of the endoscope, via, for example, rollers. The second drive unit is capable of linearly translating the shaft forward and backward and operates shaft advancement through the lower GI tract.

The control system also includes a user interface that includes a first interface mounted on a pivotal support (e.g., gimbaled) and engageable by a palm of a hand of the user. Such an interface can be used to control the first drive mechanism operating up/down and left/right deflection of the shaft.

The user interface can also include a second interface for controlling the second drive mechanism. The second interface can include a slider interface for linearly translating the shaft forward and backward.

The user interface can also include a third interface pivotally attached to the first interface. This interface can be operated by one or more fingers of a hand (e.g., pads simultaneously operable via thumb and index finger of said hand) and is used to control the endoscope shaft grasping mechanism of the linear shaft forward and backward motion.

The user interface can also include a fourth interface that includes a slider button for linearly translating the 'baby tool' shaft forward and backward and a fifth interface operable by one or more fingers of a hand (e.g., pads simultaneously operable via thumb and index finger of said hand) for actuating a tool (e.g., grasper, lasso) positioned through the working channel of the colonoscope.

A typical layout of the control system of the present invention includes a first drive unit attached to the colonoscope control knobs (or shafts thereof via the geared adaptor), a second drive unit attached to the shaft (via, for example, rollers) and a user interface positioned remotely from the colonoscope and connected to the drive units via a wired or wireless connection). The user interface can be positioned inside the operating room in close proximity to the colonoscope and patient or outside the operating room (e.g., telemedicine) in which case the patient and colonoscope can be visualized via a remote camera feed.

Figure 2:
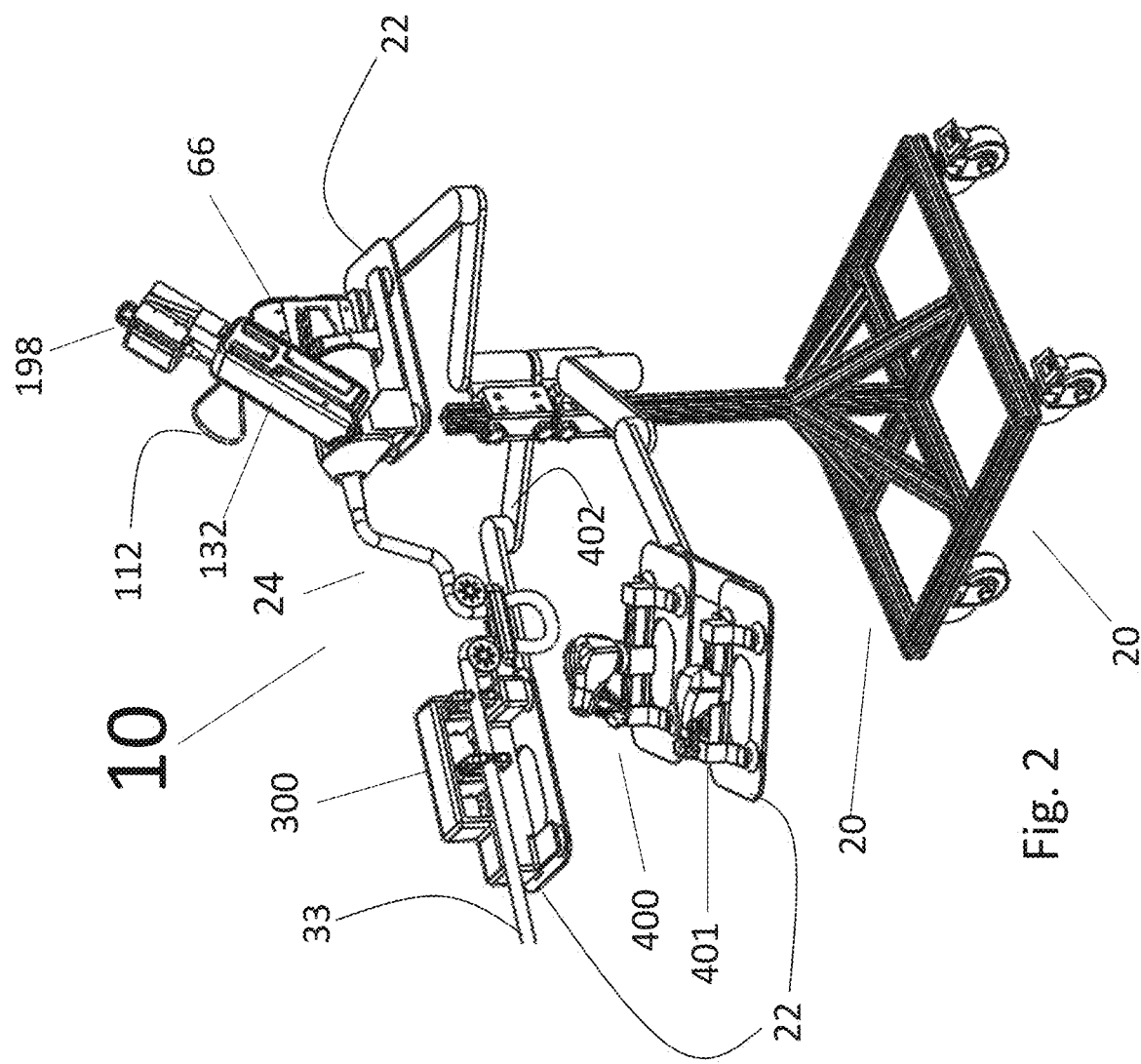
FIG. 2 illustrates the present system mounted on a cart.

Referring now to the drawings, FIGS. 1 and 2 illustrate a typical operating room setup (FIG. 1) and cart layout (FIG. 2) of the present system which is referred to herein as system 10. A monitor 12 can be used by surgeon 14 to monitor the procedure. As is shown in FIG. 1, system 10 is positioned near the patient 700 using cart 20. The modules of system 10 are placed on different articulated shelves 22 in an optimal layout (further described below with reference to FIGS. 10-11). The surgeon operates colonoscope 24 through user interfaces 400 and 401.

FIGS. 3*a-c* illustrate an off the shelf colonoscope 24 (Pentax EC-3831L Flexible Video Colonoscope Endoscope), having body 26 fitted with manual knobs 28 and 30. Surgeon 14 can deflect distal tip 32 of shaft 33 by rotating knobs 28 and 30 to a desired orientation. A camera cable and light source 34 with attached adapter 36 are also connected to body 26 of colonoscope 24.

FIG. 3*b* illustrates adapters 40 and 42 that replace manual knobs 28 and 30. Adapters 40 and 42 have a keyhole pattern designed to engage the ends of shafts 44 and 46 that serve to mechanically transmit knob inputs to the articulation mechanism of colonoscope 24. Adapter 40 has a round base 48 and adapter 42 has a round base 50. Round bases 48 and 50 serve as stoppers for manual knobs 28 and 30 or the mechanical gears retrofitted in place thereof. FIG. 3*b* also illustrates valve buttons 52 and 54 of colonoscope 24 that provide an interface for suction and air/water (respectively) through tunnels 51 and 53 (respectively).

FIG. 3*c* illustrates adapters 40 and 42 attached to shafts 44 and 46 (the keyholes prevent sliding of adapters 40 and 42).

Figure 3F:
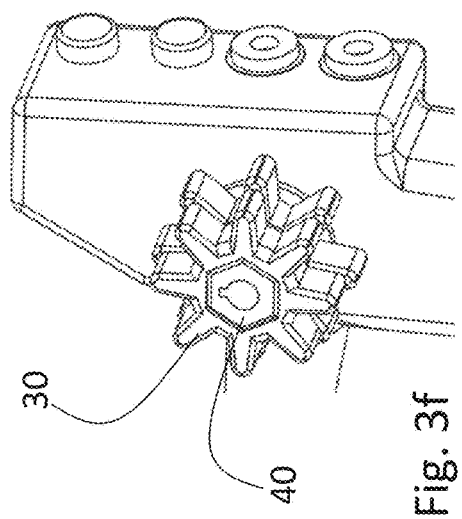
Figure 3I:
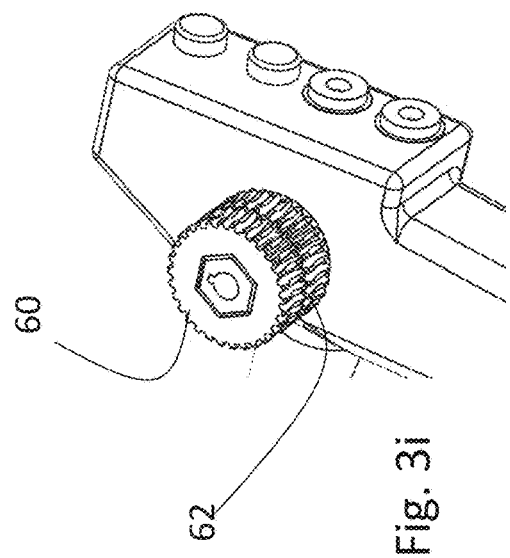
Figure 3E:
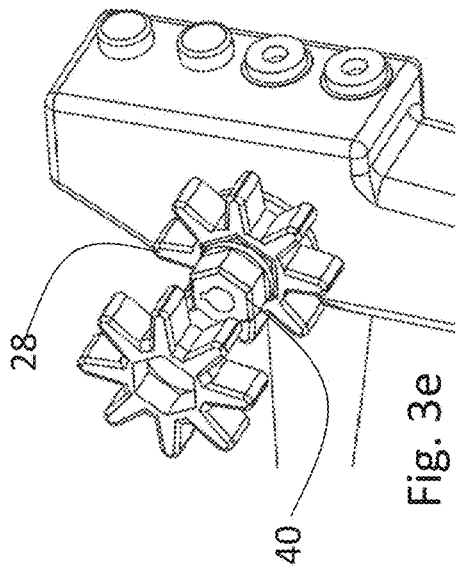
Figure 3H:
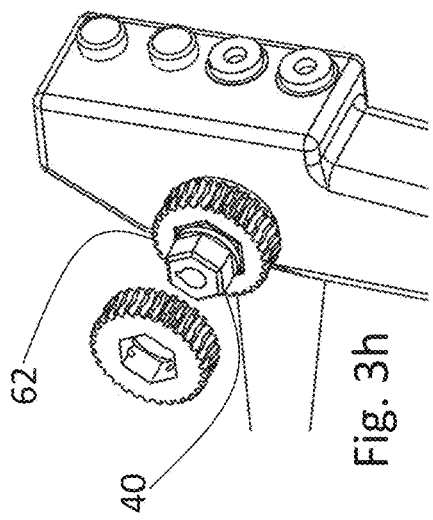
Figure 3D:
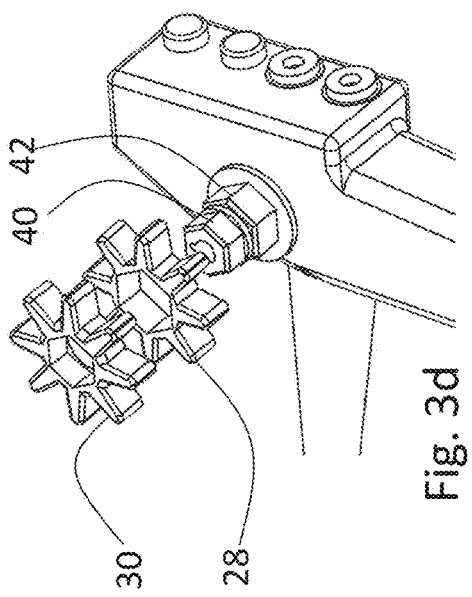

FIGS. 3*d-f* illustrate an embodiment of the present invention in which manual knob 28 is coupled to adapter 42 and manual knob 30 is coupled to adapter 40. Such coupling still enables colonoscope 24 to be manually operated through knobs and facilitates rapid switching between manual and motorized operation of colonoscope 24.

Figure 3G:
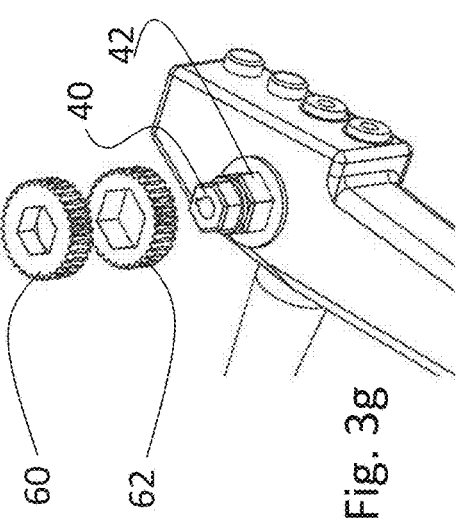

FIGS. 3*g-i* illustrate coupling of gear 60 is coupled to adapter 40 and gear 62 is coupled adapter 42. Following such coupling, colonoscope 24 can be fitted with a drive unit 66 for actuating articulation through gears 60 and 62. Additional functions of colonoscope 24 (various valves and buttons) can also be coupled to other drive/control mechanisms thereby converting colonoscope 24 from manual to fully motorized operation.

FIGS. 4*a-k* illustrate the components of drive unit 66. Drive unit 66 is attached to an external surface of body 26 of colonoscope 24. Motors of drive unit 66 are coupled to knobs 40 and 42 of colonoscope 24 (or shafts thereof through gears) enabling conversion of any standard manual colonoscope into a motorized (e.g., robotic) colonoscope.

FIG. 4*a* illustrates coupling of motors 68 and 69 to gears 60 and 62 fitted on colonoscope 24. Housing 70 of drive unit 66 is secured to colonoscope body 26 via bracket 72. Motors 68 and 69 attached along a vertical plate 78 of chassis 70 are coupled to gears 60 and 62 via worm gears 74 and 76. Potentiometers 80 and 82 are also attached to vertical plate 78 and coupled to worm gears 74 and 76 via gears 61 and 63. Motors controller 75 is secured colonoscope body 26 via bracket 72.

FIG. 4c-e illustrate a drive unit which is referred to herein as drive unit 132 that can be used to control 'baby tool' advancement and actuation through a working channel of colonoscope 24.

Colonoscopy oftentimes requires sampling or treatment of tissue during the procedure. Such sampling or treatment can be carried out using a 'baby tool' that is inserted through a working channel of colonoscope 24, and is positioned out of a distal end of colonoscope shaft 33 such that an end effector thereof is in proximity to a desired tissue. The surgeon can then use the end effector (e.g., grasper, or lasso or any other tool), in order to treat or retrieve a tissue sample.

A typical baby tool (Referred to herein as tool 110) is shown in FIG. 4c. Tool 110 includes a thin flexible shaft 112 (typically 1.2-3.1 mm in diameter with a length of 60-210 cm). Tool 110 includes an end effector 114 at a distal end of shaft 112. End effector 114 is typically manually operated, using fixed handle 118 and slider button 127. Pushing slider button 127 over handle 118 toward distal end of shaft 112 opens the jaws of tool 110 and vice versa.

FIG. 4c illustrates an adapter 130 connected to housing 70. Adapter 130 connects a tool 110 push/pull drive unit 132 to housing 70 using screws (not seen) that pass-through holes 134. Port 136 in body 26 provides access to the working channel of colonoscope 24.

FIG. 4d illustrates the basic components of drive unit 132 of tool 110. In order to translate shaft 112 in an out of the working channel and accurately position end effector 114 at a desired anatomical landmark, shaft 112 is inserted into groove 142 of adapter 130 and is secured via knob 144.

Adapter 130 is connected to slider 148 having a typical movement range of 50 mm. slider 148 is driven via a screw mechanism that includes screw 156, a motor (not seen) and a gear 158 that is coupled to gear 160.

To use tool 110, a surgeon slides shaft 112 through the working channel of colonoscope 24 until end effector 114 is visible in monitor 12. The surgeon then secures shaft 112 to adapter 130 as described above.

Figures 4F, 4G:
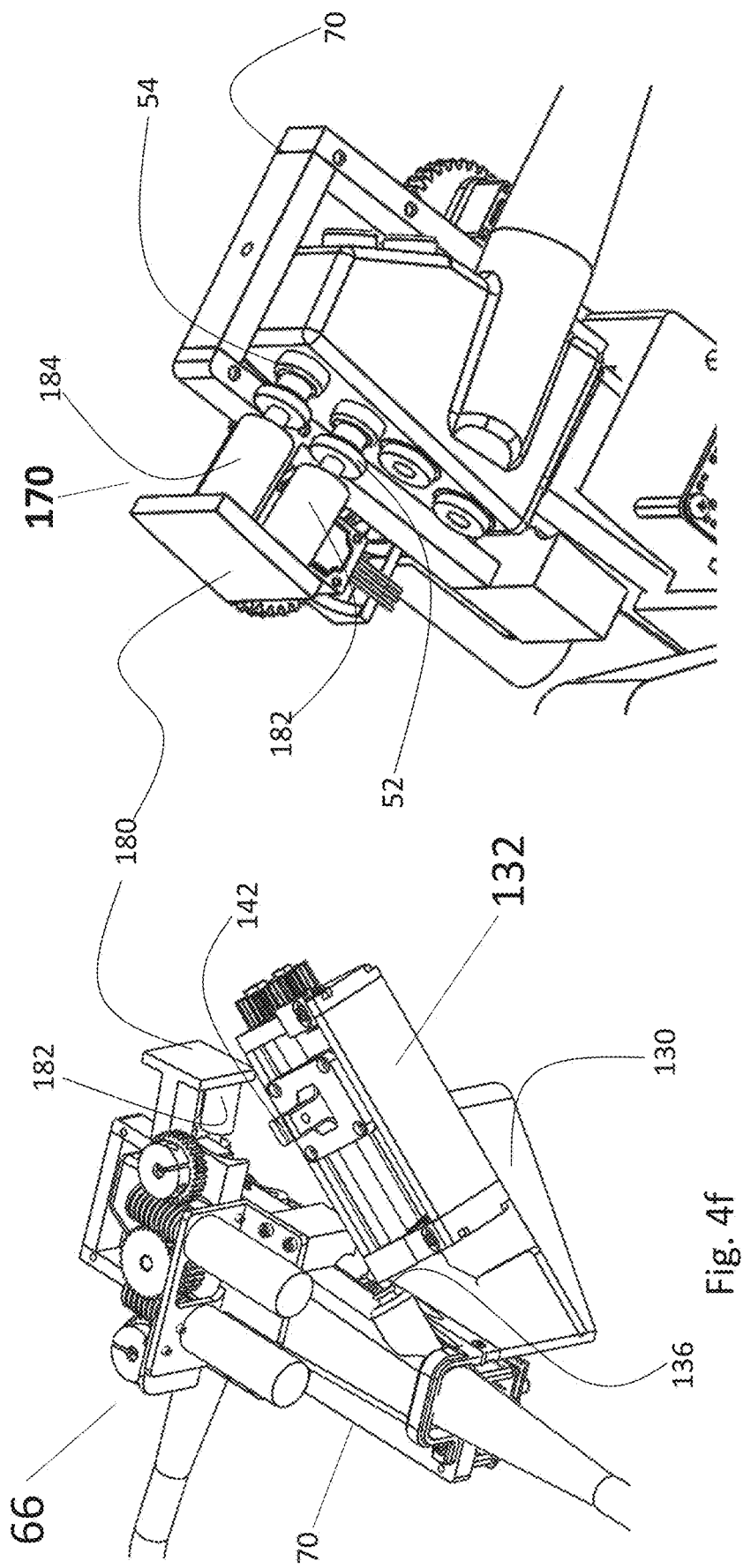

FIG. 4f illustrates drive unit 132 connected to housing 70 via adapter 130, groove 142 is aligned with the center of port 136.

FIG. 4g illustrates a motorized mechanism 170 for motorized activation of suction valve 52, and air/water valve 54.

Housing 70 includes a protrusion 180 that serves as an enclosure for solenoids 182 and 184 that activate valves 52 and 54 (respectively). The surgeon controls the state of each valve via switches as is further described hereinbelow with reference to FIG. 7b.

Figure 4I:
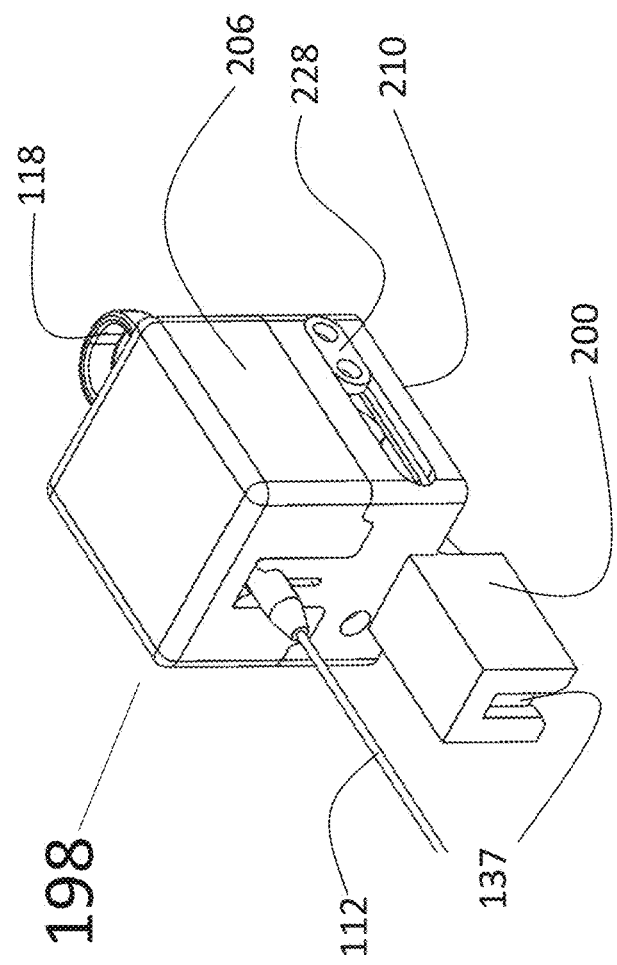
Figure 4H:
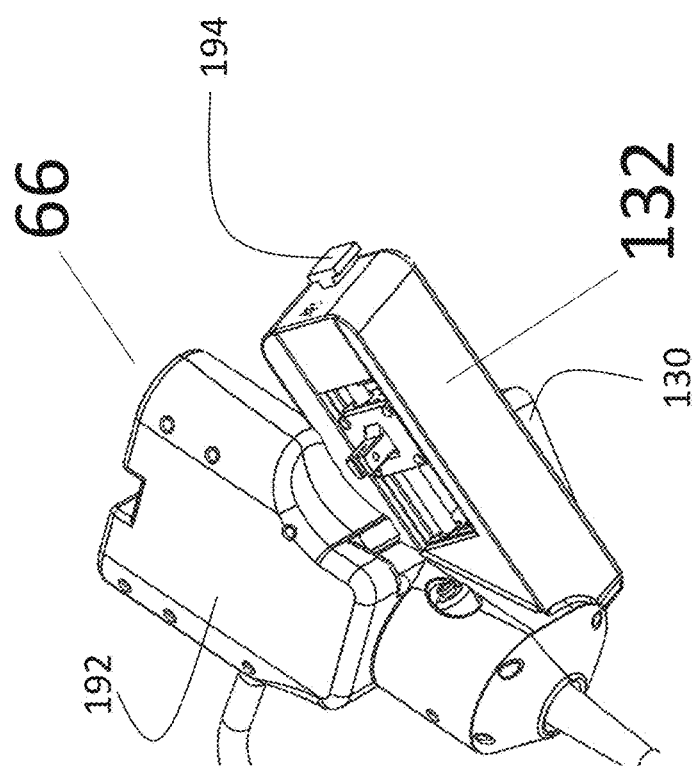

FIG. 4h illustrates a configuration in which drive unit 132 and drive unit 66 share a common enclosure 192. Rail 194 forms a part of enclosure 192 and serves as a connector for an open/close module 198 for tool 110 (FIG. 4i). Module 198 may be releasably connected to drive unit 132, via connector 200. Connector 137 is part of chassis 210. In order to activate the open/close actions of tool 110 handle 118 is inserted into module 198 with shaft 112 directed towards drive unit 132. Button 127 of tool 110 is clamped into the open/close mechanism of module 198 and cover 206 is slide over chassis 210 in order to close module 198.

Figure 4K:
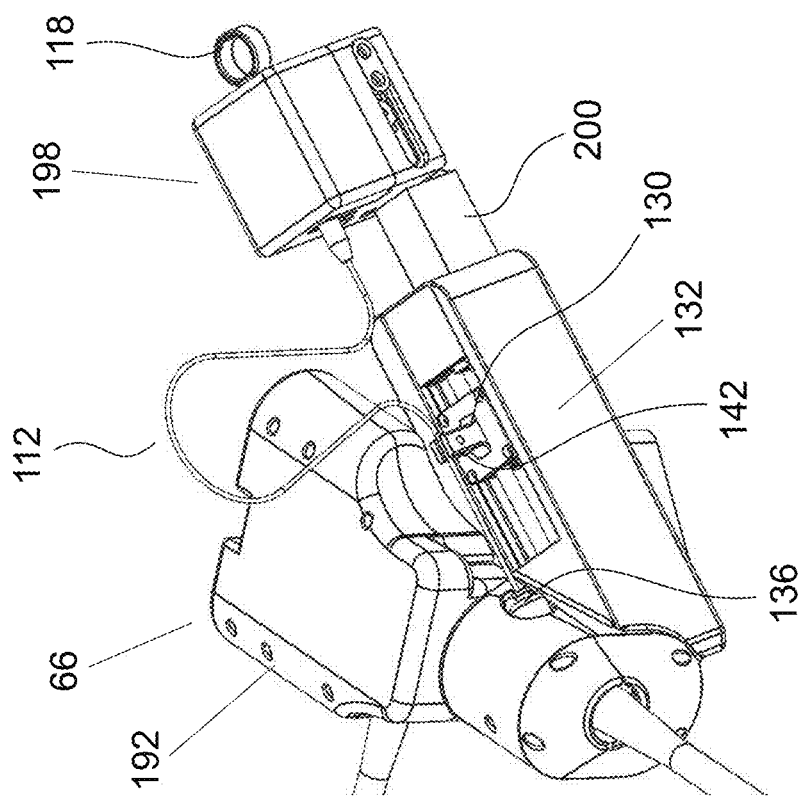
Figure 4J:
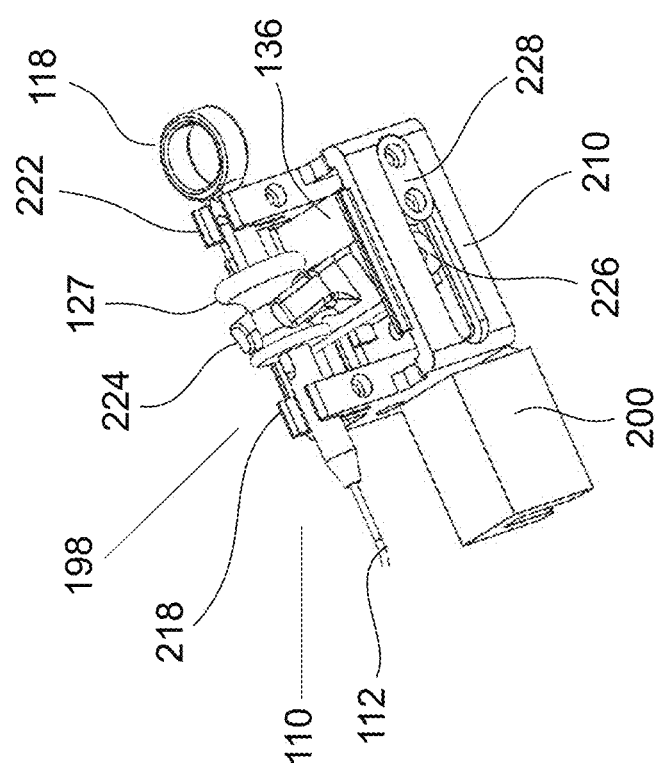

FIG. 4j illustrates the open/close mechanism of module 198. Handle body 118 is clamped into housing 218 and into housing 222, with the sliding button 127 clamped into the arms of rotating lever 224. Lever 224 is connected to a servomotor 226 that is in turn connected via slider 228 to chassis 210. Slider 228 of servomotor 226 is used for optimizing the point of rotation of lever 224, enabling the use of various types, length and shapes, of different baby tools.

When lever 224 rotates in a forward direction, handle 127 is pushed forward. Handle 127 is connected to end effector 114 through a push/pull wire. By pushing the push/pull wire of baby tool 110 the jaws mechanism of end effector 114 causes the jaws to open. A backward movement of sliding button 127 will cause jaws of end effector 114 to close.

FIG. 4k illustrates a typical configuration of drive units 66, 132 and module 198. Drive unit 132 is connected to drive unit 66. Module 198 which activate the open close of baby tool distal end effector 114 is connected to drive unit 132.

FIG. 4l illustrates drive units 66 and 132 and module 198 assembled in housing 217. Vacuum pads 237 are used to secure housing 217 to any flat surface, as is further described hereinbelow.

Figure 5A:
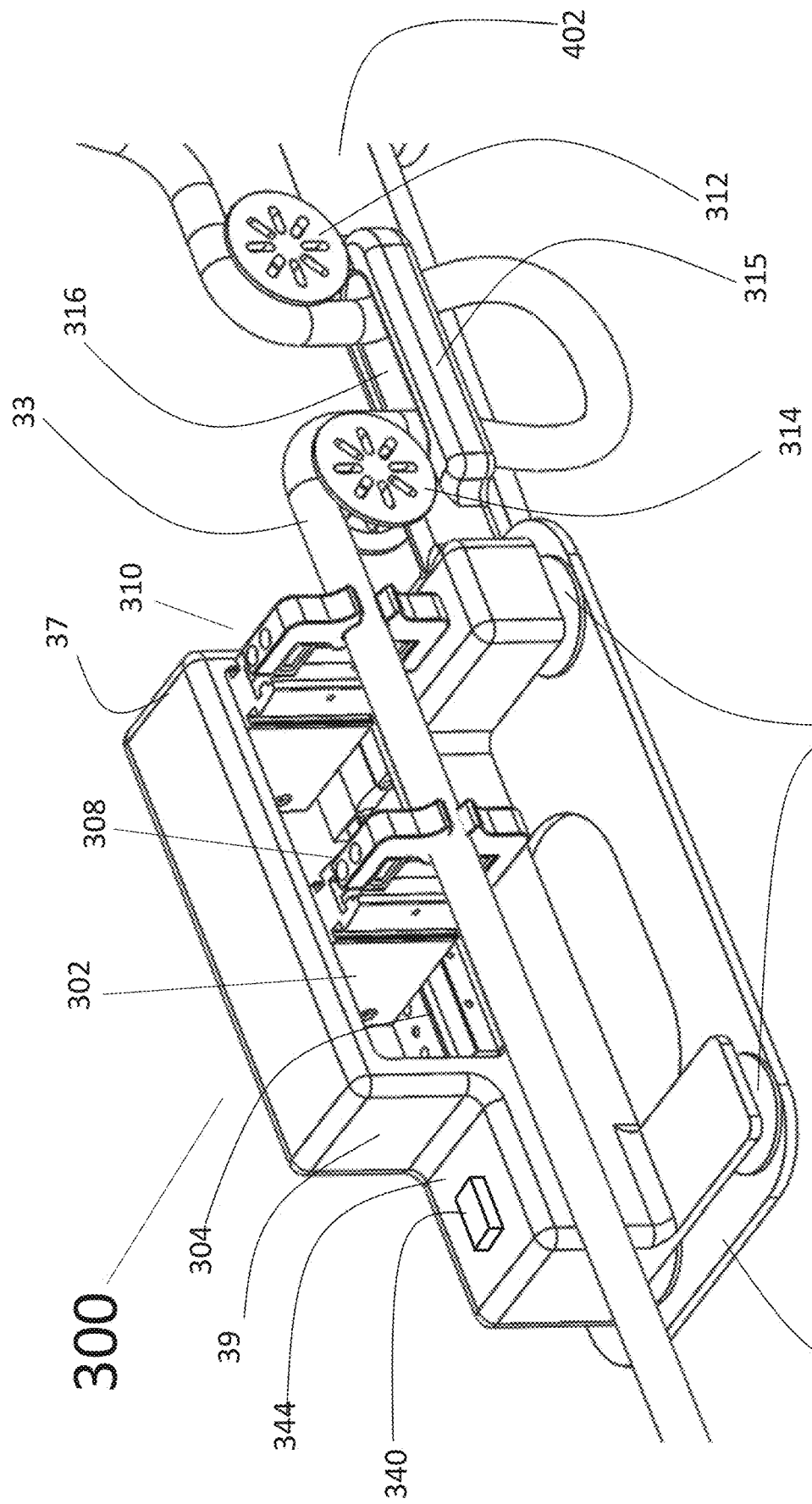
FIGS. 5a-c illustrate the shaft push/pull drive unit of the present invention.
Figure 5C:
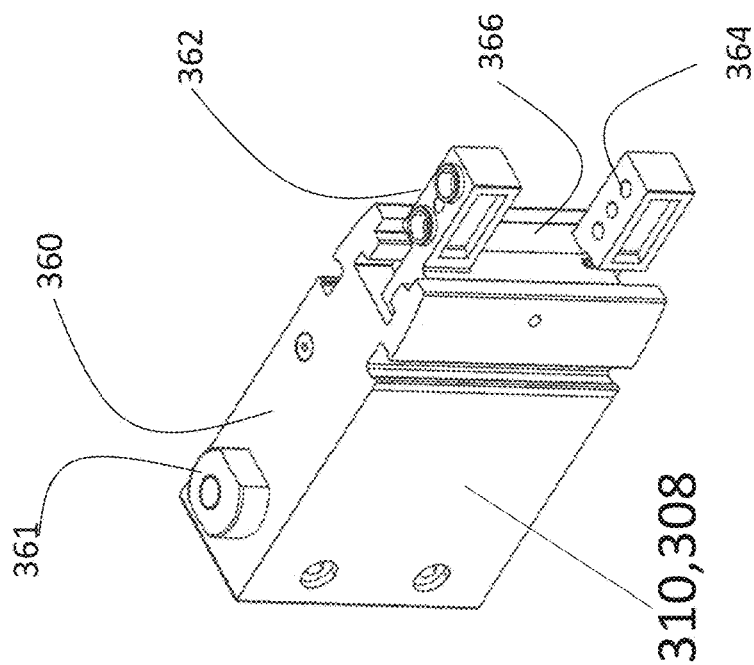
Figure 5B:
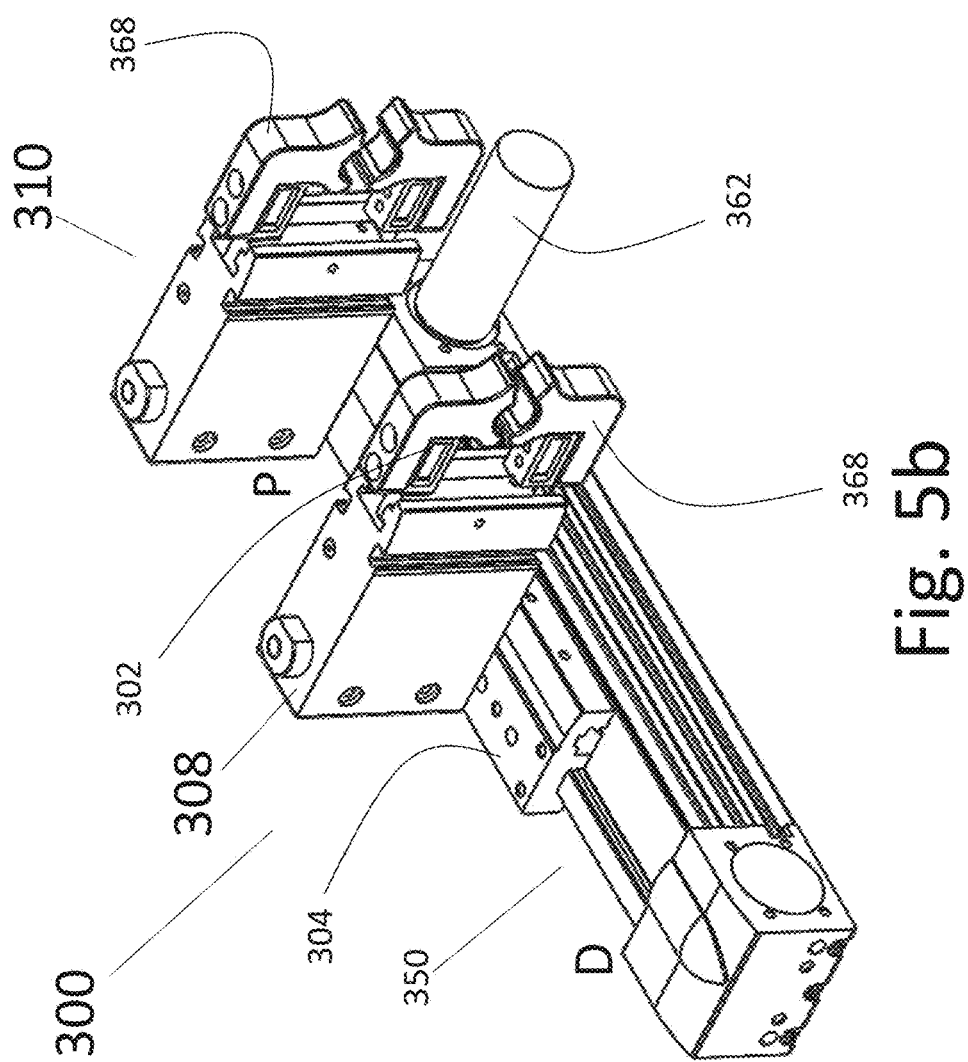

FIGS. 5a-c illustrate a drive unit 300 for advancing/retracting a flexible shaft 33 of an endoscope 24.

FIG. 5a is a perspective view of drive unit 300. Drive unit 300 includes a motorized linear mechanism 302 that drives linearly slider 304 having a linear travel range of 100 mm, and 2 grasping actuators 308 and 310.

Rollers 312 and 314 flank arm 315 with groove 316 positioned therebetween. The roller and grove setup lead flexible shaft 33 into grasping actuator 310. A cover 344 is connected to plate 22 typically via vacuum pads 330. Plate 22 is connected to cart 20 via arm 402.

A button 340 on cover 344 controls both grasping actuators (308 and 310). To install flexible shaft 33 in drive unit 300, a surgeon clicks button 340 to open grasping actuators 308 and 310, flexible shaft 33 can then be placed between the jaws of grasping actuators 308 and 310 and locks flexible shaft 33 within grasping actuators 308 and 310 by clicking the button 340 again.

FIG. 5b illustrates the components of drive unit 300. Body 350 includes a screw-based linear drive mechanism that drives slider 304 over body 350 (from point P indicating proximal position to point D indicating distal position). Grasping actuator 308 is attached to slider 304. Grasping actuator 308 travels linearly with slider 304 and is referred to hereinunder as the 'moving grasping actuator'. Grasping actuator 310 is attached to the proximal end P of body 350 and is referred to hereinunder as the 'fixed grasping actuator'. Both grasping actuators 308 and 310 have covers 368 designed to optimal contact with flexible shaft 33, enabling the use of various types, length coating material and diameters, of different endoscopes types.

FIG. 5c illustrates grasping actuators 308 and 310. Body 360 includes motor 361 and a screw based linear mechanism. The linear mechanism drives arm 362 and arm 364 along rail 366.

FIGS. 6a-c and 7a-b illustrate the user interface (hereinunder interface 400) of drive unit 300.

Figure 6C:
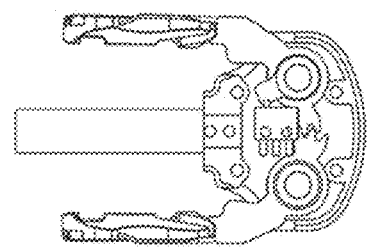
FIGS. 6a-c illustrate the finger interface (FIG. 6a) and the various control states thereof (FIGS. 6b-c).
Figure 6B:
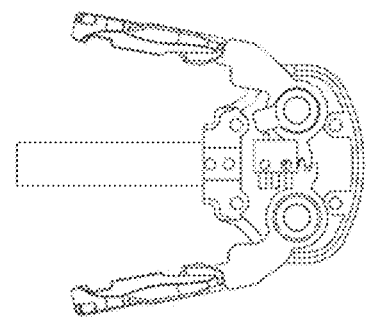
Figure 6A:
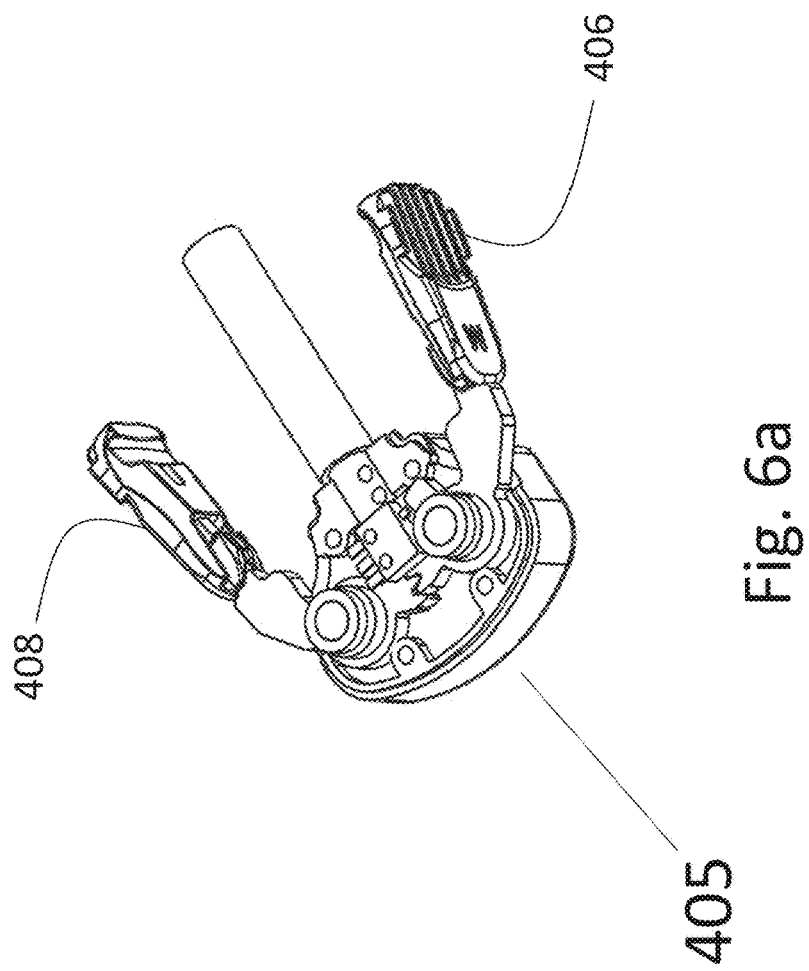

In order to control shaft 33 push/pull via drive unit 300, a surgeon grasps palm rest 402 of body 404 of interface 400 (FIG. 7a) with the index finger and thumb engaging finger pads 406 and 408 of finger interface 405 (FIGS. 6b-c). Finger pads 406 and 408 can be actuated between the open state shown in FIG. 6b and the closed state shown in FIG. 6c.

Fingers pads 406 and 408 control grasping actuator 308 and 310. When finger pads 406 and 408 are open FIG. 6b, the jaws of grasping actuator 308 are open. When finger pads 406 and 408 are closed FIG. 6c, the jaws of grasping actuator 308 are closed and apply a frictional force to flexible shaft 33. This frictional force enables the surgeon to control push/pull of flexible shaft 33.

Control interface 400 also controls distal articulation 32 of flexible shaft 33 and suction and air/water valves. In order to understand the mechanism and structure of the distal articulation 32 control by interface 400, reference is made now to FIG. 7b.

Figure 7A:
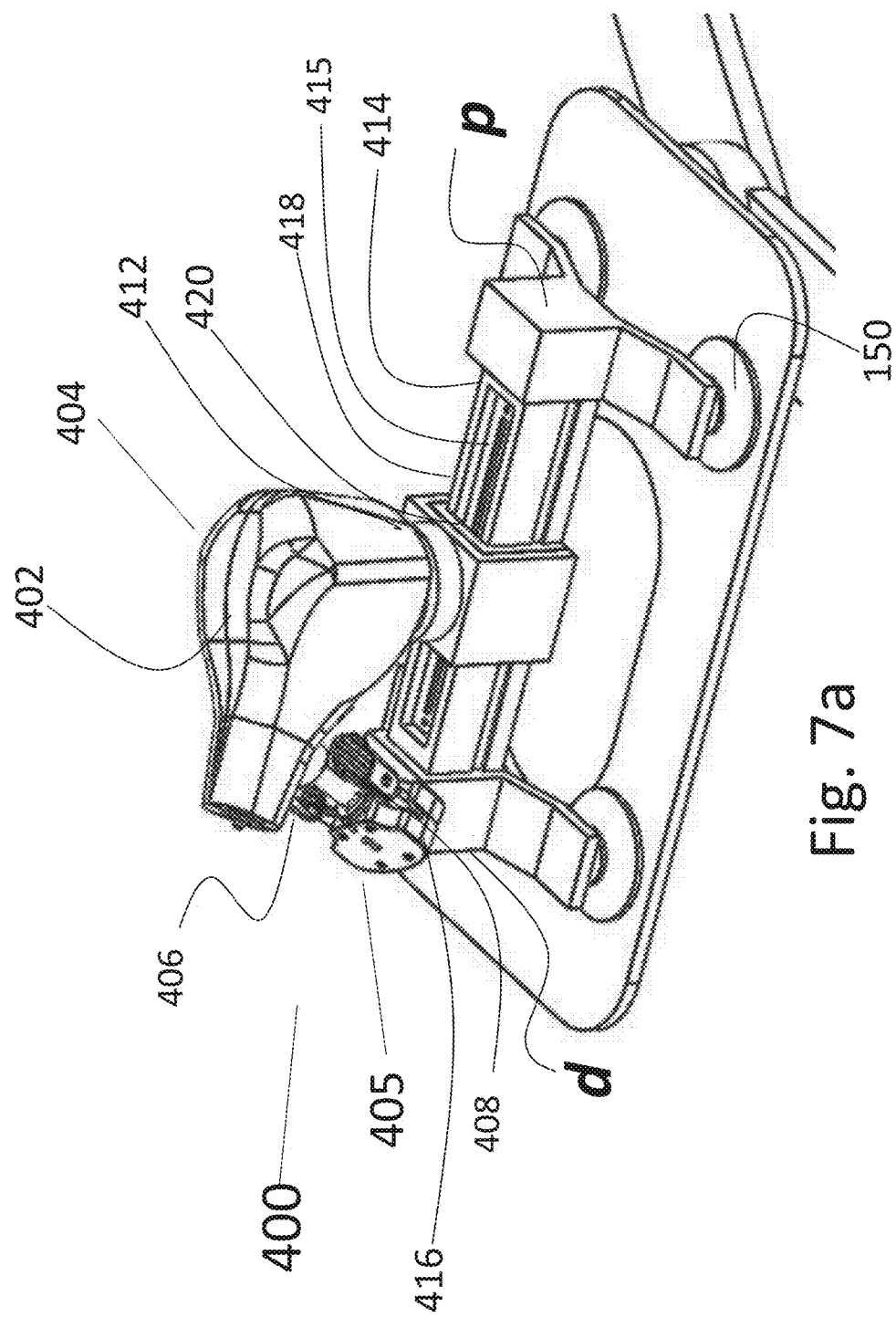
FIGS. 7a-c illustrate endoscope shaft and 'baby tool' interfaces of the present invention.
Figure 7C:
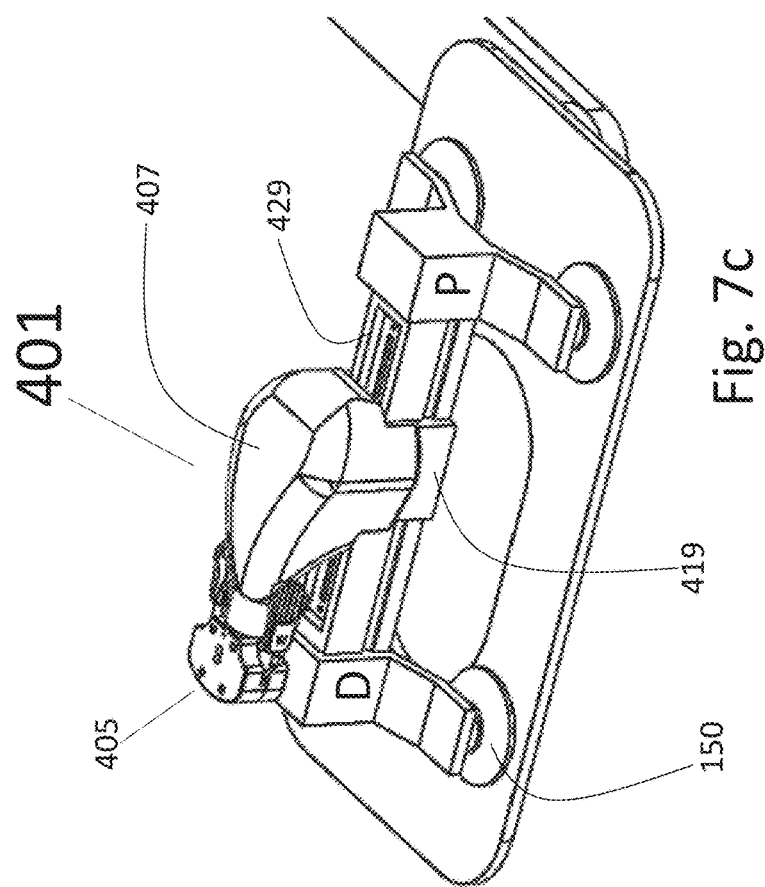
Figure 7B:
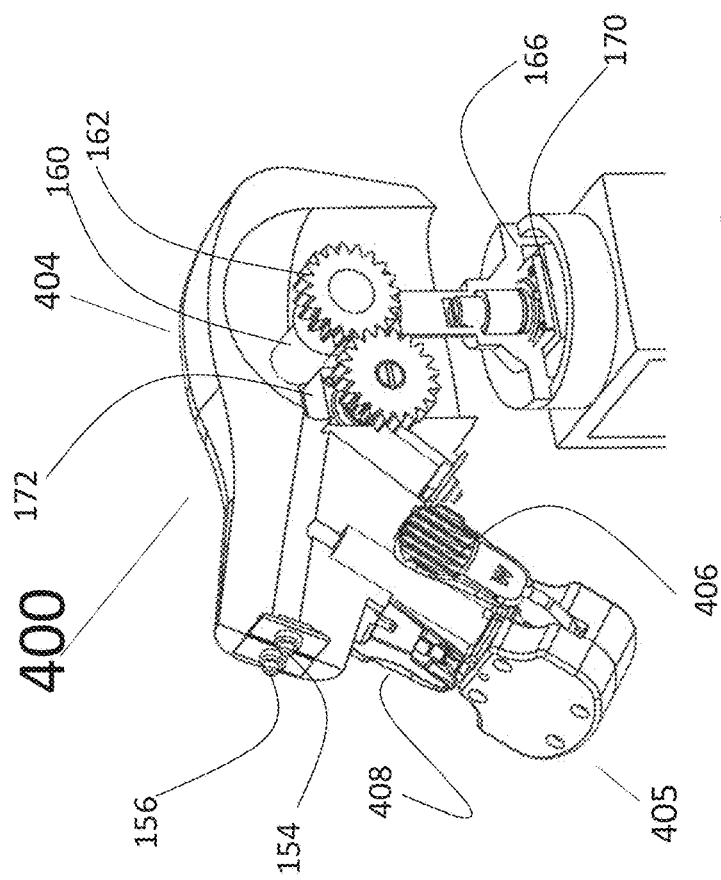

FIG. 7b illustrates the structure and components that allow the surgeon to simultaneously control the articulation of flexible shaft 33 and the valves 52,54 of the suction and air/water functions via buttons 154 and 156 (respectively).

In order to control of left/right up/down movement of articulation, the surgeon rotates interface body 404 to the desired side and elevation. Potentiometers 170 172 measure the orientation of body 404 (as demonstrated in FIG. 7b), and their electric signals are converted by electric controller 75 into rotation commands to motors 68 and 70. When motors 68 and 69 rotate, worm gear 74 and 76 rotates resulting in rotation of the shafts of the distal articulation mechanism. While rotating, worm gears 74 and 76 also rotate gears 61 and 63. Gears 61, 63 are coupled to rotational potentiometers 80, 81.

The signal from potentiometers 80,81 are send to controller 75 and compared to the signals from orientation potentiometers 170, 172 of body 404, resulting controller 75, to send the next rotation commands to the motors, until the measurements of the processed signals from the potentiometers 80, 81 of the motors and the potentiometers 170, 172 of control interface body 404 are equal, or in the range of allowed difference.

The above cycle of measurements and movement may be sampled in frequency of 100 Hz or more insuring fast reaction of the articulation mechanism without any delay.

Body 404 is connected to housing 412 as is shown in FIG. 7a. Housing 412 may slide linearly between proximal end 414 (p) and distal end 416 (d) of housing 418. A linear potentiometer is positioned in housing 418, when the surgeon slides housing 412 along slider housing 420, a linear potentiometer 415 slider measures the position and direction of interface body 404. The combined measurements of body 404 of interface 400 and the state of finger's pads 406 and 408 enable the surgeon to control drive unit 300, as will be described in details in FIGS. 9a-g.

In order to control 'baby tool' shaft by push/pull module 132, the surgeon holds the palm part of body 407 of interface 401 (FIG. 7c), and slide housing 419 along slider housing 429, a potentiometer slider measures the position of interface body 407. The position signals from the potentiometer are send to controller 75, that translate the signals into motion commands to module 132 that drives 'baby tool' shaft 112. While controlling the linear movement of shaft 112 the surgeon may simultaneously control the activation of end effector 114 by controlling the open-close state of pads 406 and 408 of fingers interface 405. Controller 75 measures the state of the finger's pads 406 and 408, and activate accordingly open-close module 198, enable the surgeon to control the position of 'baby tool' shaft 112 distal end and to control the activation of end effector 114 simultaneously.

FIGS. 8a-h illustrate add on motorized module enabling roll movement of the flexible shaft along its long axis. The roll movement can be used by the surgeon to better position the distal end of the flexible shaft while it's advanced in the GI.

In order to rotate endoscope flexible shaft 33, module 500 is connected to push/pull module 300 via connector 510, positioning point C, the center of the flexible shaft at the center of arc 508. Arc 508 is hingbly connected to frame 502. Arc 508 includes gear 507 at its distal end that meshes with worm gear 506. Motor 504 rotates worm gear. When motor 504 is activated by interface 400 (described with reference to FIGS. 8e-h), push/pull module 300 rotates around points C, as is shown in FIGS. 8c-d.

FIGS. 8e-h illustrates add on rotating frame module 600. Module 600 is comprised of fixed base 606 having vacuum legs 604. Frame 608 is hingbly connected to fixed frame 606 through hinges 603 and 605. Rotation sensor 602 is connected to hinge 605 and measure continuously angle α. In order to control the rotation of colonoscope shaft around its center, interface 400 is attached to surface 607 of rotating frame 608 via vacuum pads 150. To rotate the colonoscope shaft, the surgeon tilts the interface thereby similarly rotating frame 608. Rotation sensor measurements serve as input for motor 504 that rotates module 300 around center point C. FIGS. 8g-h exemplify tilt positions of frame 608. Such an interface configuration enables the surgeon to control simultaneously and intuitively the push/pull movement of flexible shaft 33, the articulation (up/down left/right) of distal end 32 and the roll angle of flexible shaft 33.

There are several operational states for grasping actuator 308:
 (i) closed and static;
 (ii) open and static;
 (iii) closed with distal movement (toward patient body);
 (iv) closed with proximal movement (out of patient body);
 (v) open distal movement; and
 (vi) open and proximal movement.

FIGS. 9a-g schematically illustrate a sequence of interface 400 inputs and the corresponding mechanical outputs of drive unit 300.

FIG. 9a schematically Figure flexible shaft 33 with its distal end located at point A in the lower GI tract of the patient. Finger pads 406 and 408 are in an open state and grasping actuator 308 is likewise open. Grasping actuator 310 is closed in order to eliminate any undesired movement of colonoscope shaft 33.

FIG. 9b illustrates finger pads 406 and 408 in the closed state, grasping actuator 308 is likewise closes and grasps flexible shaft 33. Grasping actuator 310 is open however, shaft 33 does not move since the surgeon has not moved palm rest 404.

When the surgeon moves interface body 404 distally toward point D with finger pads 406 and 408 in the closed state grasping actuator 308 moves toward point D. Since grasping actuator 310 is open flexible shaft 33 is translated from point A to point B in the GI tract of the patient.

Figures 9D, 9E, 9F, 9G:
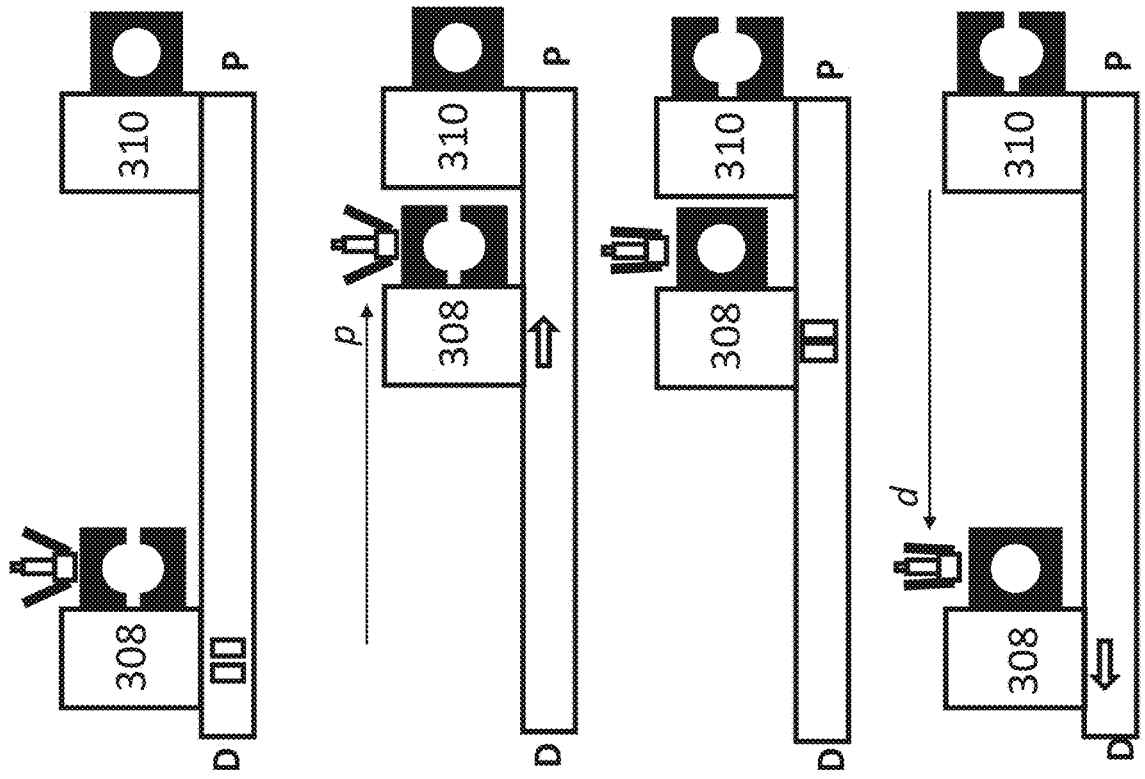

In order to advance shaft 33 from point B to point C, the surgeon opens finger pads 406 and 408 thus closing grasping actuator 310, and opening grasping actuator 308 (FIG. 9d). The surgeon then slides interface body 404 to point P, the surgeon then closes finger pads 406 and 408 thus closing grasping actuator 308 and opening grasping actuator 310. Moving interface body 404 distally with fingers pads 406 and 408 closed (FIG. 12g) results in movement of flexible shaft 33 to point C. This sequence of events is similar to manual pinch and drag of a colonoscope shaft and enables the surgeon to drag flexible shaft 33 forward and backward in an intuitive way mimicking the manual procedure without a need to master new skills and surgical techniques. It should be noted that in any time the surgeon may choose to control the movement of flexible shaft 33 manually, in cases for example where haptic feedback is needed.

The scale between the linear movement of palm rest body 404 and the travel of the distal end of flexible shaft 33 can be selected at any time during the procedure by surgeon according to his needs. A typical scale can range between 1:0.5, to 1:4.

System 10 of the present invention can be used in a lower GI procedure (e.g., colonoscopy) as follows.

Figure 10:
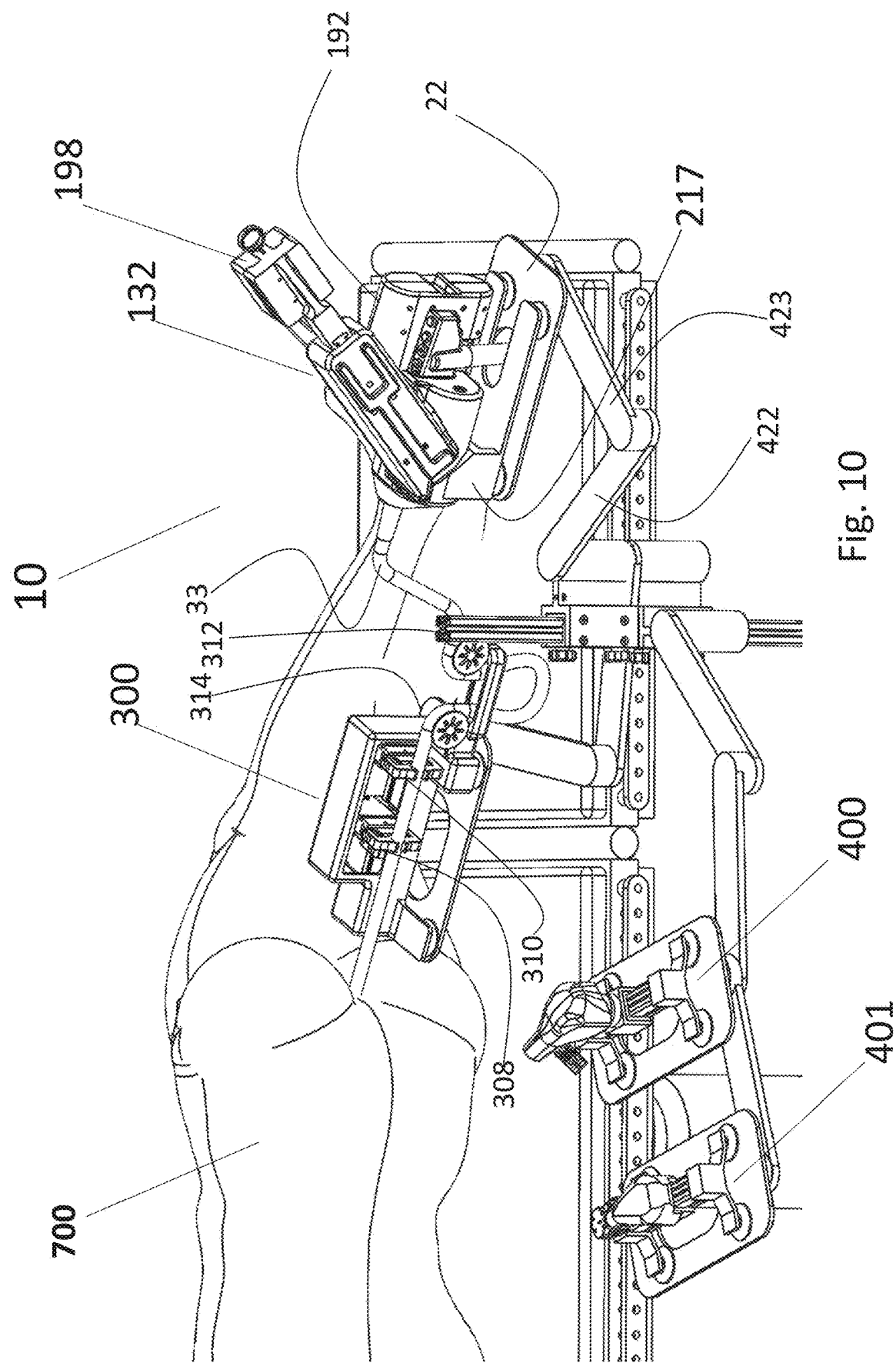
FIG. 10 illustrates one of many possible setup configurations of the system.

FIG. 10 illustrates a typical setup of system 10 that can be used in lower GI procedure. A patient 700 lays on his/her side with his/her back facing system 10. A distal end of flexible shaft 33 is inserted into the lower GI of the patient through the anal orifice. Drive unit 300 is moved to a desired position and flexible shaft 33 is installed into drive unit 300 and grasped by both grasping actuators (308 and 310). Drive units 66, 132 and 198 having common cover 192, assembled into base 217, located on shelve 22 are moved by arms 422 and 423, to an optimal position with respect to drive unit 300. The slack of flexible shaft 33 is handled by leading wheels 312, 314. Colonoscope control interface 400 and baby tool control interface 401 are positioned on different plates to fit the convenience of the surgeon.

In order to operate, the surgeon holds both interfaces 400 and 401 and moves flexible shaft 33 through the lower GI. The surgeon can use interface 400 to position the distal end of flexible shaft in an optimal position and articulation orientation with respect to patient anatomy, while simultaneously controlling the position and the activation of the baby tool end effector, using interface 401. At any time, the surgeon may operate the suction/irrigation system and the air system by pressing button buttons 154 and 156 (shown in FIG. 7b) located at the front of interface body 404. Also, at any time, the surgeon may choose to disconnect the endoscope and the baby tool from the motorized modules in order to control the movement of flexible shaft 33 and/or the baby tool manually, in cases where, for example, haptic feedback is needed.

Figure 11:
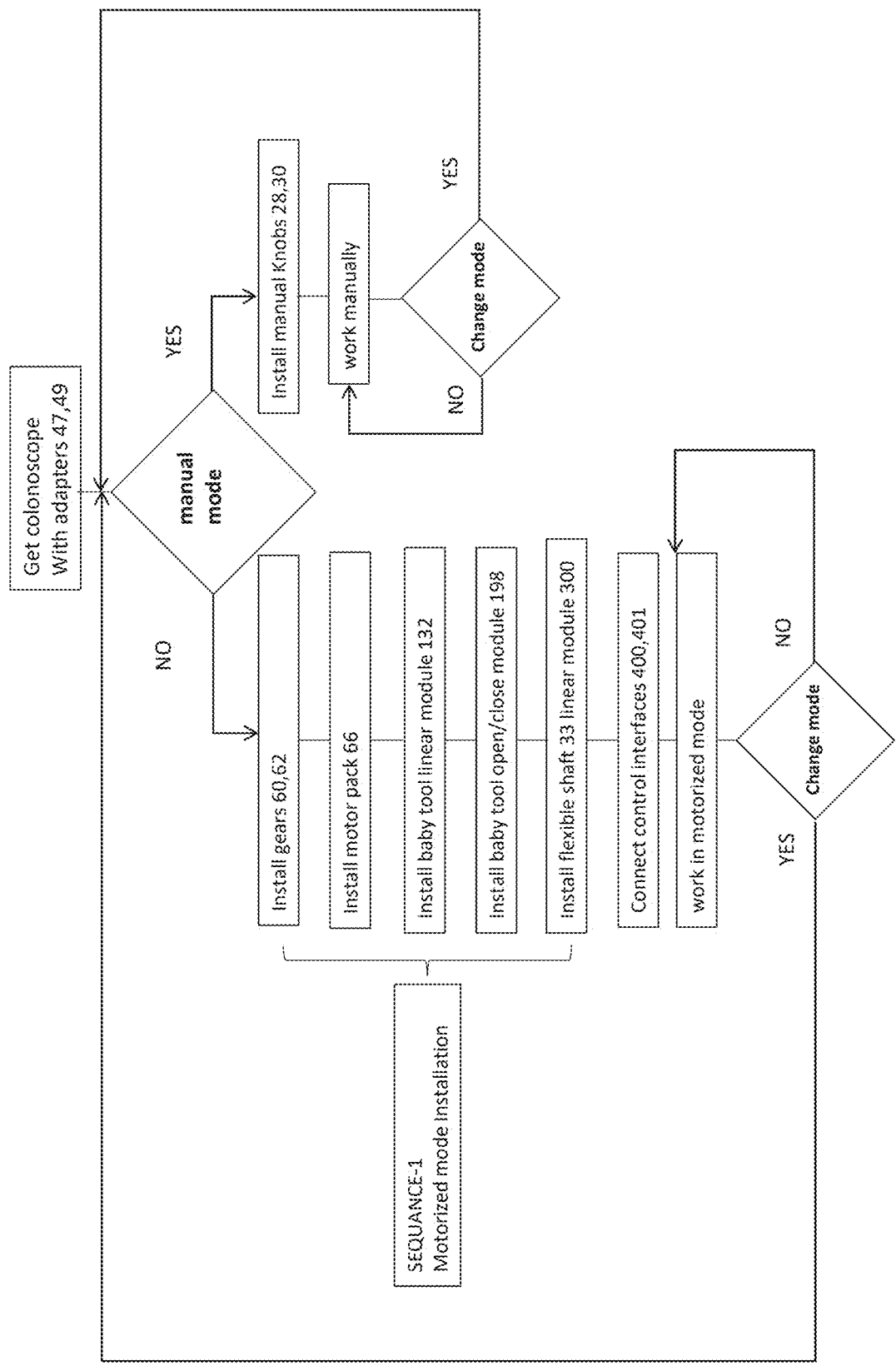
FIG. 11 is flow chart outlining setup of the present colonoscope control system and a workflow enabling switching between motorized and manual modes.

FIG. 11 is block diagram describing work mode selection with a colonoscope fitted with, and optionally controlled by, the present system.

When the surgeon prepares the colonoscope for a procedure he/she may choose the preferred mode of work at start. If the surgeon prefers to start with a manual mode (left branch of the diagram) he/she installs the manual knobs on the adapters. If the surgeon prefers to start with the motorized mode (right branch of the diagram) he/she install gears on the adapters and then installs the motorized drive units described hereinabove.

At any stage of the procedure the surgeon may alternate between motorized and manual modes. For example, if the surgeon works in manual mode and wishes to switch to motorized mode, he/she simply removes the manual knobs and installs gears, adaptors and drive units. This procedure can be reversed in cases where the surgeon wants to switch to manual mode.

As used herein the term "about" refers to +10%.

Additional objects, advantages, and novel features of the present invention will become apparent to one ordinarily skilled in the art upon examination of the following examples, which are not intended to be limiting.

EXAMPLES

Reference is now made to the following example, which together with the above descriptions, illustrate the invention in a non-limiting fashion.

Bench Testing a Prototype System

A prototype of the present system was constructed and bench-tested for functionality.

Figure 12B:
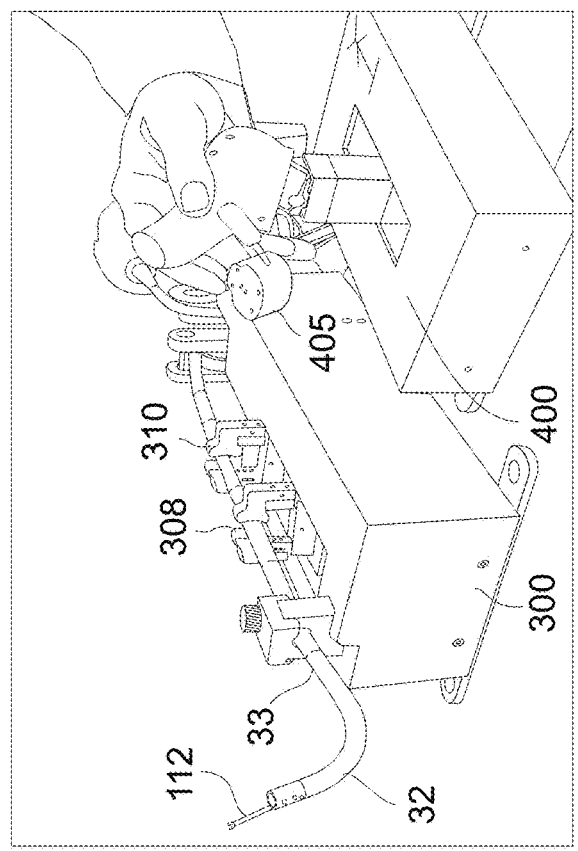
Figure 12A:
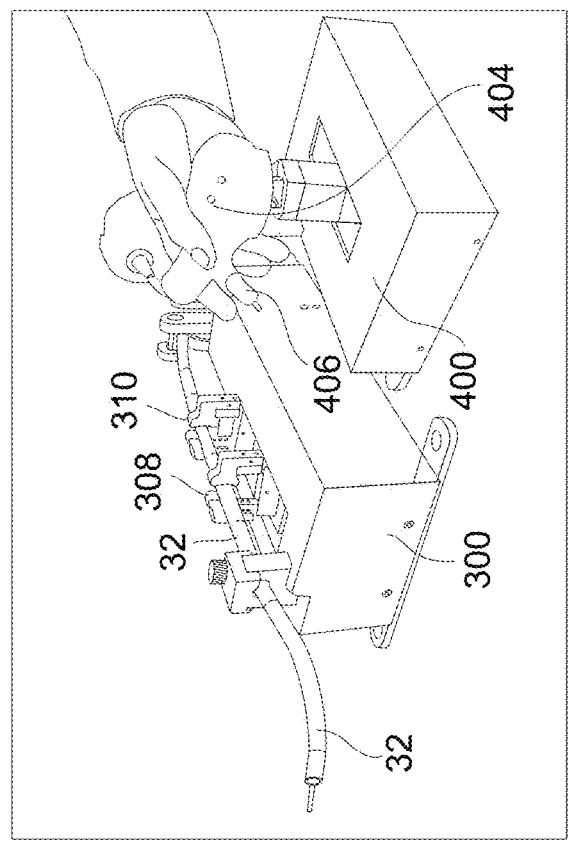

FIGS. 12a-b demonstrate flexible shaft interface 400 with the hand of the operator grasping body 404 of interface 400. Distal part 32 of flexible shaft 33 is articulated according to the orientation of body 404—right in FIG. 12a and up in FIG. 12b.

Push pull module 300 is also demonstrated in these Figures. With pads 406, 408 of the fingers interface in the open position (and grasper 308 open and fixed grasper 310 closed).

Figure 12G:
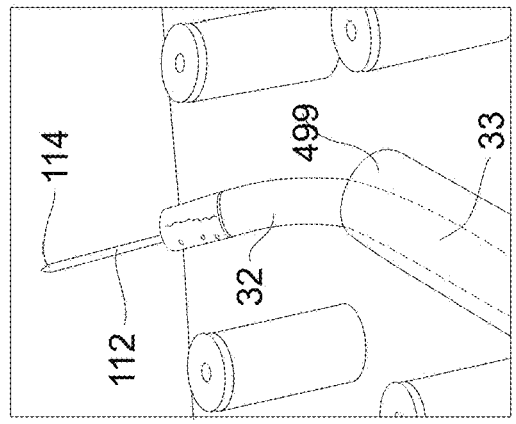
Figure 12D:
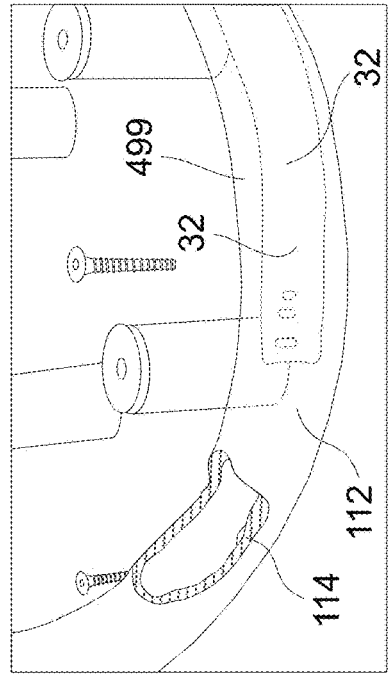
Figure 12F:
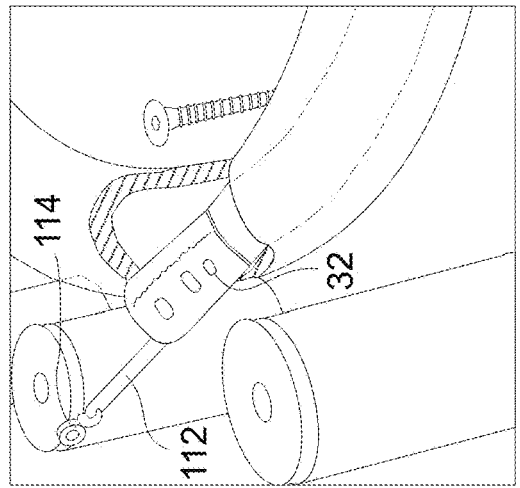
Figure 12C:
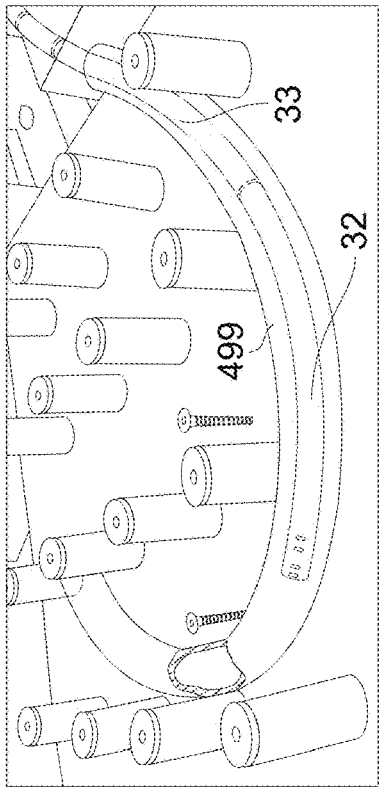
Figure 12E:
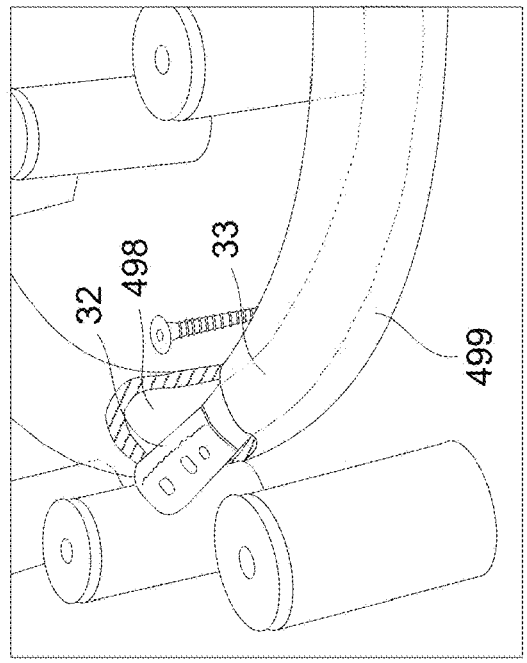

A GI simulator (designated 499) was used for testing maneuvering of the flexible shaft (FIGS. 12c-g). FIG. 12c demonstrate movement of flexible shaft 33 with distal portion 32 in the GI simulator. FIG. 12d demonstrates distal end of 'baby tool' shaft 112 and grasper 114 of baby tool 110 delivered from the distal end of shaft 33 distal portion 32. FIG. 12e demonstrates the articulation control capabilities of the present system, showing distal portion 32 beings articulated and navigated out of the GI simulator. FIG. 12f demonstrates the ability to control baby tool 110 (shaft 112 and end effector 114) while navigating flexible shaft 33 out of the GI simulator. FIG. 12g demonstrates control of the distal articulation 32 of flexible shaft 33 with concomitant control of the baby tool 110. FIG. 12h demonstrates manual control over flexible shaft 33 with graspers 308 and 310 in the open position.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the Extent that section headings are used, they should not be construed as necessarily limiting. In addition, any priority document(s) of this application is/are hereby incorporated in its/their entirety.

What is claimed is:

1. A system comprising:
a colonoscope having a shaft deflectable via two rotatable knobs or gears replacing the two rotatable knobs, and
a control system comprising:
(a) a first drive unit mounted externally to a housing of the colonoscope, said first drive unit includes a first drive mechanism for engaging the two rotatable knobs or gears replacing the two rotatable knobs;

(b) a second drive unit being attachable to an outer surface of the shaft of the colonoscope, said second drive unit being capable of linearly translating the shaft forward and backward; and (c) a user interface including:
  (i) a first interface being mounted on a pivotal support, said first interface being engageable by a palm of a hand, said first interface being for controlling said first drive mechanism; and
  (ii) a second interface for controlling said second drive unit, said second interface being capable of sliding back and forth to linearly translate the shaft forward and backward.

2. The system of claim 1, wherein said gears form a part of an adaptor attached to said external surface of a housing of the colonoscope.

3. The system of claim 1, wherein said first drive unit controls up/down and left/right deflection of the shaft.

4. The system of claim 1, further comprising a third interface being pivotally attached to said first interface and being engageable by one or more fingers of a hand, said third interface being for operating an end effector.

5. The system of claim 4, wherein said third interface includes pads simultaneously operable via thumb and index finger of said hand.

6. The system of claim 1, wherein said pivotal support is gimbaled.

\* \* \* \* \*